United States Patent
Wang et al.

(10) Patent No.: US 11,827,827 B2
(45) Date of Patent: Nov. 28, 2023

(54) METHOD FOR PREPARING INDIUM PHOSPHIDE NANOCRYSTAL BY USING NOVEL PHOSPHORUS PRECURSOR AND INDIUM PHOSPHIDE NANOCRYSTAL PREPARED BY THE SAME

(71) Applicant: SUZHOU XINGSHUO NANOTECH CO., LTD., Jiangsu (CN)

(72) Inventors: Yunjun Wang, Jiangsu (CN); Yuliang Shan, Jiangsu (CN)

(73) Assignee: SUZHOU XINGSHUO NANOTECH CO., LTD., Jiangsu (CN)

(*) Notice: Subject to any disclaimer, the term of this patent is extended or adjusted under 35 U.S.C. 154(b) by 66 days.

(21) Appl. No.: 17/604,452

(22) PCT Filed: Apr. 17, 2020

(86) PCT No.: PCT/CN2020/085274
§ 371 (c)(1),
(2) Date: Oct. 18, 2021

(87) PCT Pub. No.: WO2020/211834
PCT Pub. Date: Oct. 22, 2020

(65) Prior Publication Data
US 2022/0195301 A1    Jun. 23, 2022

(30) Foreign Application Priority Data

| Apr. 18, 2019 | (CN) | 201910311285.3 |
| May 10, 2019 | (CN) | 201910388638.X |
| Jun. 28, 2019 | (CN) | 201910574541.8 |
| Jun. 28, 2019 | (CN) | 201910574567.2 |

(51) Int. Cl.
| C09K 11/88 | (2006.01) |
| C01B 25/08 | (2006.01) |
| C09K 11/08 | (2006.01) |
| C09K 11/70 | (2006.01) |
| B82Y 20/00 | (2011.01) |
| B82Y 40/00 | (2011.01) |

(52) U.S. Cl.
CPC .......... *C09K 11/883* (2013.01); *C01B 25/087* (2013.01); *C09K 11/0883* (2013.01); *C09K 11/70* (2013.01); *C09K 11/703* (2013.01); *B82Y 20/00* (2013.01); *B82Y 40/00* (2013.01); *C01P 2002/60* (2013.01); *C01P 2004/04* (2013.01); *C01P 2004/64* (2013.01); *C01P 2004/80* (2013.01)

(58) Field of Classification Search
CPC ... C09K 11/9883; C09K 11/883; C09K 11/70; C09K 11/703; C01B 25/087; B82Y 20/00; B82Y 40/00
See application file for complete search history.

(56) References Cited

U.S. PATENT DOCUMENTS

| 2006/0202167 A1* | 9/2006 | Landry ............... C23C 18/1204 |
| | | 252/301.4 R |
| 2008/0199381 A1* | 8/2008 | Tokumitsu ............ C01B 25/087 |
| | | 423/299 |
| 2019/0048259 A1* | 2/2019 | Kim ....................... H10K 50/16 |

FOREIGN PATENT DOCUMENTS

| CN | 103113882 A | | 5/2013 |
| CN | 106433640 A | | 2/2017 |
| CN | 106479482 A | | 3/2017 |
| CN | 106701076 A | | 5/2017 |
| CN | 106987250 | * | 7/2017 |
| CN | 107098324 A | | 8/2017 |
| CN | 107338048 A | | 11/2017 |
| CN | 108239535 A | | 7/2018 |
| JP | 2010138367 A | | 6/2010 |

OTHER PUBLICATIONS

Tama's Veszpre' mi et al., "Structures of Alkali Metal Pseudohalides LiOCP, NaOCP, LiSCP, NaSCP", Inorganic Chemistry: vol. 35, Issue 7. Mar. 27, 1996.

* cited by examiner

*Primary Examiner* — C Melissa Koslow
(74) *Attorney, Agent, or Firm* — Gang Yu (57) ABSTRACT

The present application discloses a method for preparing an indium phosphide (InP) nanocrystal by using a novel phosphorus precursor as a raw material, and an InP nanocrystal having different wavelengths prepared by the method. The preparation method of the InP nanocrystal includes a step of: using $M\text{-}(O\text{---}C\equiv P)_n$ as one of reaction precursors, where M is a metal element, and n is a valence state of the M element. In this present application, $M\text{-}(O\text{---}C\equiv P)_n$ serves as one of reaction precursors; due to that the metal element M and the element P are from the same reaction precursor, a nanocrystal of a nanocrystal core containing In, P and a metal element M can be prepared.

19 Claims, 2 Drawing Sheets

METHOD FOR PREPARING INDIUM PHOSPHIDE NANOCRYSTAL BY USING NOVEL PHOSPHORUS PRECURSOR AND INDIUM PHOSPHIDE NANOCRYSTAL PREPARED BY THE SAME

TECHNICAL FIELD

The present application belongs to the field of nano materials, and especially relates to a method for preparing an indium phosphide (InP) nanocrystal by using a novel phosphorus precursor as a raw material, and an indium phosphide nanocrystal having different wavelengths prepared by the method.

BACKGROUND

Compared with organic fluorescent dyes, nanocrystal has the advantages of photobleaching resistance, high quantum yield, narrow peak width at half height and the like and thus, has a great application prospect in the fields of display, illumination and bioimaging. However, quantum dots (cadmium selenide, cadmium telluride, etc.) of II-VI groups elements which have been studied and applied at most in the prior art contain high-toxic elements, and thus have obvious neurotoxicity, limiting the application of such quantum dots.

Compared with the quantum dots of II-VI groups elements, the quantum dot of III-V group elements represented by InP quantum dot has no inherent toxicity, and has wider application scopes, and thus is gradually concerned by the scientific research field and industrial circle. However, the emission wavelength of the InP quantum dot synthesized by the prior art is generally within 500-700 nm, which limits its application in the scope of wavelength above 700 nm and below 500 nm. Moreover, for the optical properties of InP nanocrystal synthesized by the prior art, such as luminous efficiency, fluorescence emission peak, peak width at half height, and the like, there is still a rather obvious gap relative to the nanocrystals of II-VI groups elements.

It is very significant to optimize the preparation method of InP nanocrystal, expand wavelength range, promote quantum yield, and to reduce peak width at half height.

SUMMARY

Directed to the above technical problem, the present application provides a preparation method of an InP nanocrystal.

According to an aspect of the present application, provided is a preparation method of an InP nanocrystal, including a step of: using M-(O—C≡P)n as one of reaction precursors, where, M is a metal element, and n is a valence state of the M element; such as, n is 1, 2 or 3.

Further, M-(O—C≡P)n is Li—O—C≡P, Na—O—C≡P, K—O—C≡P, Zn—(O—C≡P)$_2$ or Ga—(O—C≡P)$_3$. Further, the InP nanocrystal contains M, In, and element P, and an optional Zn element. Further, the reaction precursor also includes an In precursor. Further, the reaction precursor also includes a Zn precursor. Further, the method includes steps of: subjecting a solution including an In precursor, M-(O—C≡P)$_n$, an optional Zn element and a solvent to high temperature treatment, thus obtaining an InP nanocrystal core; and where, the high temperature reaction has a temperature within 150-340° C., and preferably, within 150-300° C. Further, the method includes a step of: coating a shell on the nanocrystal core. Further, the solvent is a coordination compound. Further, the coordination compound is amine or carboxylic acid.

According to another aspect of the present application, provided is an InP nanocrystal which is prepared by the above preparation method.

Beneficial effects: in this present application, M-(O—C≡P)$_n$ serves as one of reaction precursors; due to that the metal element M and the element P are from the same reaction precursor, a nanocrystal of a nanocrystal core containing In, P and a metal element M can be prepared; and the prepared InP nanocrystal has a wide luminous wavelength range and excellent luminescence property.

The present application further provides a preparation method of a near-infrared InP nanocrystal.

According to one aspect of the present application, provided is a preparation method of a near-infrared InP nanocrystal, including steps of: S1, obtaining a first solution system containing an In precursor and a second solution system containing a P precursor; S2, mixing the first solution system containing the In precursor with the second solution system containing the P precursor for reaction at a predetermined temperature to obtain the InP nanocrystal; where the first solution system containing the In precursor includes the In precursor and a first organic solvent dispersing the In precursor; and the second solution system containing the P precursor includes the P precursor and a second organic solvent dispersing the P precursor; the first organic solvent is different from the second organic solvent, and the second organic solvent has a boiling point lower than the predetermined temperature.

Further, the second organic solvent has a boiling point at least 30° C. lower than the predetermined temperature; preferably, the synthetic method further includes a step S3, adding a precusor substance demanded for the synthesis of a shell of the nanocrystal to the reaction system of the step S2, and forming a shell on the surface of the near-infrared InP nanocrystal, such that the near-infrared InP nanocrystal has a fluorescence emission peak within 700-900 n m.

Further, the predetermined temperature ranges from 180-320° C.; and the second organic solvent has a boiling point of 60-150° C. Further, the P precursor has the chemical formula of M-(O—C≡P)$_n$, M is a metal element, and n is 1, 2 or 3. Further, the second organic solvent includes at least one of benzene, methylbenzene, cyclohexane, n-hexane, n-heptane, normal octane, tetrahydrofuran, and chloroform. Further, the reaction precursor is an indium halide. Further, the organic solvent is at least one of saturated or unsaturated amines having a carbon number not lower than 6. Further, the first solution system containing the In precursor also includes a Zn precursor. Further, the InP nanocrystal is coated with a shell.

According to another aspect of the present application, provided is a near-infrared InP nanocrystal which is prepared by the above preparation method. Further, the near-infrared InP nanocrystal has an emission peak within 700-900 nm.

Beneficial effects: by the preparation method of the present application, a novel P precursor is used to react the first solution system containing the In precursor with the second solution system containing the P precursor at a predetermined temperature. Moreover, the second organic solvent has a boiling point below the predetermined temperature, thus directly obtaining the InP nanocrystal having a wavelength range of 700-900 nm, which achieves the application of the InP nanocrystal within the scope of near-infrared wavelength, and expands the application scope of the InP nanocrystal.

The present application provides a preparation method of an red-emitting InP nanocrystal.

According to one aspect of the present application, provided is a preparation method of an red-emitting InP nanocrystal, including steps of: S1, mixing the In precursor and P precursor with an organic solvent for reaction at a first temperature, and thermally insulating for a period of time to obtain an InP nanocrystal core solution; S2, rapidly heating the InP nanocrystal core solution up to a second temperature, and thermally insulating for a period of time; S3, adding a precursor substance demanded for the synthesis of a shell of the nanocrystal to the reaction system of the step S2 to obtain the red-emitting InP nanocrystal, where the red-emitting InP nanocrystal has a fluorescence emission peak within 580-670 nm.

Further, the first temperature ranges from 110-160° C. Further, the second temperature ranges from 280-340° C. Further, in S2, the InP nanocrystal core solution is rapidly heated up to the second temperature, keeping for at least 10 min. Further, the organic solvent is at least one of saturated or unsaturated amines having a carbon number not lower than 6. Further, the P precursor has the chemical formula of $M\text{-}(O\text{---}C\equiv P)_n$, where, M is a metal element, and n is 1, 2 or 3. Further, the InP nanocrystal core solution contains a first Zn precursor. Further, the first Zn precursor is selected from a zinc halide. Further, a ratio of the first Zn precursor to the In precursor is (0.01-10):1 according to a molar ratio. Further, the shell of the nanocrystal includes at least one of ZnS, ZnSe, and ZnSeS.

According to another aspect of the present application, provided is an red-emitting InP nanocrystal which is prepared by the above preparation method.

Further, the red-emitting InP nanocrystal has a fluorescence emission peak within 580-670 nm.

By means of the above technical solution, the present application has the following beneficial effects:

In the present application, a preparation method of "low-temperature nucleation-rapidly heating up to boost the growth of the core-shell coating finally" is used to obtain the red-emitting InP nanocrystal having a fluorescence emission peak within 580-670 nm; and the fluorescence emission peak has a small peak width at half height (≤50 nm), and high fluorescence quantum yield (greater than 80%), thus satisfying the use demands of the InP nanocrystal.

The present application provides a preparation method of a cyan-emitting InP nanocrystal having a high fluorescence quantum yield.

According to one aspect of the present application, provided is a preparation method of a cyan-emitting InP nanocrystal, including steps of: S1, mixing the In precursor and P precursor with an organic solvent for reaction at a first temperature to obtain an InP nanocrystal core solution; S2, adding a cationic precursor to the InP nanocrystal core solution to form a first mixed solution at the first temperature; S3, adding a anionic precursor to the first mixed solution at a second temperature; where, the cationic precursor is reacted with the anionic precursor to coat a shell on the InP nanocrystal core, thus obtaining the cyan-emitting InP nanocrystal; the cyan-emitting InP nanocrystal has a fluorescence emission peak within 460-500 nm; and where, the second temperature is greater than the first temperature.

Further, the first temperature ranges from 110-160° C. Further, the second temperature ranges from 160-240° C., preferably, 160-200° C. Further, the organic solvent is at least one of saturated or unsaturated amines having a carbon number not lower than 6. Further, the P precursor has the chemical formula of $M\text{-}(O\text{---}C\equiv P)_n$, where, M is a metal element, and n is 1, 2 or 3. Further, the InP nanocrystal core solution contains a first Zn precursor. Further, the first Zn precursor is selected from a zinc halide. Further, a ratio of the cationic precursor in the step S2 to the In precursor in the step S1 is (8-40):1 according to a molar ratio. Further, the cationic precursor is a second Zn precursor; and the second Zn precursor is selected from zinc carboxylate or an organic zinc. Further, the anionic precursor is at least one of a S precursor and Se precursor.

According to another aspect of the present application, provided is a cyan-emitting InP nanocrystal which is prepared by the above preparation method.

Further, the cyan-emitting InP nanocrystal has a fluorescence emission peak within 460-500 nm.

By means of the above technical solution, the present application has the following beneficial effects:

By the preparation method of the present application, a cyan-emitting InP nanocrystal having a wavelength range of 460-500 nm can be obtained. The InP fluorescence quantum yield has a high fluorescence quantum yield (greater than 50%), thus expanding the application scope of the InP nanocrystal.

The preparation method of the present application is easy and simple to handle, and has high efficiency, satisfying the demands for scale production, which has a higher value for the high-quality InP nanocrystal to achieve the practical application in the field of next generation of display.

BRIEF DESCRIPTION OF THE DRAWINGS

Drawings of the description constituting a portion of the present application are used to provide a further understanding to the prevent disclosure; and schematic examples and its specification of the prevent disclosure are intended for explaining the prevent disclosure, and should not be construed to unduly limit this disclosure. In the drawings.

DETAILED DESCRIPTION OF THE EMBODIMENTS

The technical solution in the examples of the present application will be described specifically in combination with the embodiments of the present application. It should be noted that the embodiments described herein are merely partial embodiments of the present application instead of all the embodiments.

It should be indicated that the In source, Indium precursor(s) and indium precursor(s) hereafter are the same concept; P source, P precursor(s) and phosphorus precursors are the same concept; Zn source, Zn precursor(s) and zinc precursor(s) are the same concept; and S source, S precursor and S precursors are the same concept.

Figure 1:
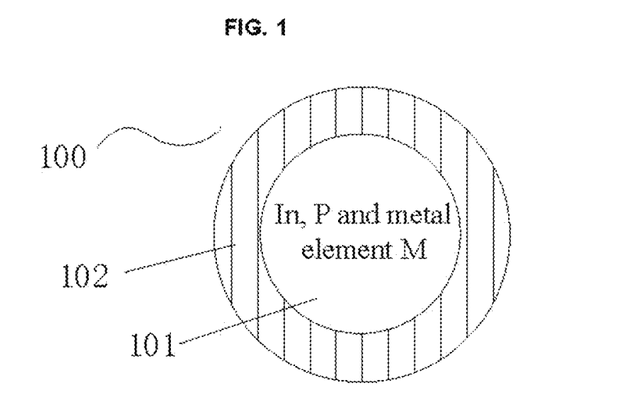
FIG. 1 is a structure diagram showing a nanocrystal in a schematic example of the present application.

FIG. 1 is a structure diagram showing an InP nanocrystal prepared in a schematic example of the present application; nanocrystal 100 includes a nanocrystal core 101; nanocrystal 101 includes In, P, and a metal element M and an optional Zn; and a shell 102 arranged on the nanocrystal core 101.

In the schematic embodiment of the present application, the preparation method of the InP nanocrystal includes a step of: using M-(O—C≡P)$_n$ as one of reaction precursors, where, M is a metal element, and n is a valence state of the M element; such as n is 1, 2 or 3.

When the element M is a monovalent metal element, such as Li, Na, K, Rb, C, n is 1. When the element M is a bivalent metal element, such as Zn, Ca, Mn, Sr, n is 2. When the element M is a trivalent metal element, such as Al, Ga, Tl, n is 3. Preferably, M-(O—C≡P)$_n$ is Li—O—C≡P, Na—O—C≡P, K—O—C≡P, Zn—(O—C≡P)$_2$ or Ga—(O—C≡P)$_3$.

When M-(O—C≡P)$_n$ serves as a reaction precursor, an alloy InP nanocrystal core containing elements P and M may be obtained, thus improving the luminescence property of the InP nanocrystal. Moreover, elements P and M are from the same reaction precursor, which may avoid that the ratio thereof is not easy to be controlled when M and P are from the different precursors in the prior art.

M-(O—C≡P)$_n$ may be synthesized according to a method in the prior art.

The above reaction precursor further includes an In precursor, and the In precursor preferably is a halide of In, such as, indium chloride, indium bromide and indium iodide. The reaction precursor further includes a Zn precursor, and the Zn precursor preferably includes zinc carboxylate. The preparation of the InP nanocrystal includes the steps of preparing an InP nanocrystal core, and then a shell is contained on the surface of the InP nanocrystal core. The preparation of the InP nanocrystal includes the steps of: subjecting a solution containing an In precursor, M-(O—C≡P)$_n$ and a solvent to high temperature treatment, and the temperature of the high temperature treatment is preferably within 150° C.-300° C., and more preferably, within 180° C.-240° C. The solvent is preferably a coordination compound, and the coordination compound includes carboxylic acid, such as, oleinic acid, and myristic acid; and the coordination compound may also be amines, such as oleylamine, octadecylamine and tetradecylamine.

It should be understood that unless otherwise specified, the preparation method of the prevent disclosure is the same as the reaction environment required for the preparation of the nanocrystal in the prior art. Before reaction, moisture and oxygen in a reaction vessel are removed by an inert gas atmosphere or an air atmosphere whose moisture and oxygen have been removed, such that each reaction procedure in the experiment is conducted under the protection of an inert gas atmosphere. The inert gas atmosphere includes at least one of nitrogen, argon or rare gases. It should be understood that a solvent has different boiling points under different pressure, and the boiling point of the solvent in the present application refers to the boiling point under standard atmospheric pressure.

The present application provides a preparation method of a near-infrared InP nanocrystal, including steps of: S1, obtaining a first solution system containing the In precursor and the optional Zn precursor, and a second solution system containing M-(O—C≡P)$_n$ as a P precursor; where, M is a metal element, n is 1, 2 or 3; S2, mixing the first solution system containing the In precursor with the second solution system containing the P precursor for reaction at a predetermined temperature to obtain the InP nanocrystal; where the first solution system containing the In precursor includes an In precursor and a first organic solvent dispersing the In precursor; and the second solution system containing the P precursor includes a P precursor and a second organic solvent dispersing the P precursor; the first organic solvent is different from the second organic solvent, and the second organic solvent has a boiling point lower than the predetermined temperature.

In a preferred embodiment of the present application, the boiling point of the second organic solvent is at least 30° C. lower than the predetermined temperature. Preferably, the synthetic method further includes a step S3, adding a precusor substance demanded for the synthesis of a shell of the nanocrystal to the reaction system of the step S2, and forming a shell on the surface of the near-red-emitting InP nanocrystal, such that the near-red-emitting InP nanocrystal has a fluorescence emission peak within 700-900 nm.

According to a preferred embodiment of the present application, in the S2 of the present application, the step of mixing the first solution system containing the In precursor with the second solution system containing P precursor for reaction has a temperature scope of 180-320° C.; and the boiling point of the second organic solvent is less than or equal to 150° C., preferably, 60-150° C.

In a specific embodiment, firstly, the temperature of the first solution system containing the In precursor is regulated to 180-280° C.; and then the second solution system containing P precursor is added to obtain an In—P mixed solution system; afterwards, the In—P mixed solution system is heated up to 280-320° C. for thermal insulation and reaction for a period of time, thus obtaining the solution system containing the InP nanocrystal.

Further, when the element M is a monovalent metal element, such as Li, Na, K, Rb, Cs, n is 1. When the element M is a bivalent metal element, such as Zn, Ca, Mn, Sr, n is 2. When the element M is a trivalent metal element, such as Al, Ga, Tl, n is 3. In some specific embodiments, the P precursor M-(O—C≡P)$_n$ is Li—O—C≡P, Na—O—C≡P, K—O—C≡P, Zn—(O—C≡P)$_2$ or Ga—(O—C≡P)$_3$.

In the present application, M-(O—C≡P)$_n$ serves as a novel P precursor to synthesize the InP nanocrystal. The In precursor and M-(O—C≡P)$_n$ are mixed for reaction at a predetermined temperature, which may obtain the InP nanocrystal having a wavelength range of 700-900 nm only by a single charging mode. Meanwhile, the P precursor M-(O—C≡P)$_n$ of the present application may further provide a metal element M, thus preparing a nanocrystal of an allay core composed of In, P and metal element M, thus further optimizing the optical property of the InP nanocrystal.

According to a preferred embodiment of the present application, the second organic solvent includes at least one of benzene, methylbenzene, cyclohexane, n-hexane, n-heptane, normal octane, tetrahydrofuran, and chloroform.

According to a preferred embodiment of the present application, the In precursor is an indium halide. In some specific embodiments, the In precursor includes at least one of indium chloride, indium bromide and indium iodide.

According to a preferred embodiment of the present application, the first organic solvent is at least one of saturated or unsaturated amines having a carbon number not lower than 6. In a specific embodiment, the first organic solvent includes at least one of hexylamine, heptyl amine, octylame, trioctylamine, nonyl amine, decyl amine, decyl enamine, undecylamine, undecyl enamine, lauryl amine, dodecyl enamine, tridecyl amine, tridecyl enamine, tetradecylamine, pentadecanamine, pentadecyl enamine, cetylamine, heptadecyl amine, octadecylamine, octadecyl enamine, oleylamine, decyl enamine, undecyl enamine, dodecyl enamine, tridecyl enamine, tetradecyl enamine, pentadecyl enamine, hexadecyl enamine, heptadecyl enamine, and octadecyl enamine According to a preferred embodiment of the present application, the first solution system containing the In precursor also includes a Zn precursor. In some specific embodiments, Zn precursor includes at least one of zinc acetate, zinc chloride, zinc carbonate, zinc decylate, zinc undecylenate, zinc stearate, zinc oleate and zinc diethyldithiocarbamate.

It is found by the inventor that during the preparation of the InP nanocrystal, a certain amount of Zn precursor is introduced into a reaction system, thus further reducing the surface defect of the nanocrystal core and enhancing the energy level luminous efficiency of the nanocrystal.

According to a preferred embodiment of the present application, the In nanocrystal is coated with a shell. In a specific embodiment, a precusor substance demanded for the synthesis of the shell is added to the solution system containing the nanocrystal to obtain a shell-coated InP nanocrystal. The precusor substance demanded for the synthesis of the shell includes at least one of a Zn precursor, and S precursor and a Se precursor.

According to a preferred embodiment of the present application, the method further includes the step of removing unreacted raw materials and other impurities after obtaining the above InP nanocrystal, specifically including separation and purification, thus further improving the optical property of the prepared InP nanocrystal. These steps are common general methods in the art, and thus are not stated any more.

According to a preferred embodiment of the present application, provided is an InP nanocrystal which is prepared by the above preparation method; and the InP nanocrystal has an emission peak within 700 nm above, preferably 700-900 nm.

In the prior art, a method of increasing the size of the InP nanocrystal is generally used to obtain a large-wavelength InP nanocrystal. But such method always causes the problems of increased surface defect and difficult wavelength control, which cannot satisfy the application requirements. The preparation method of the present application can directly obtain the InP nanocrystal having a wavelength range of 700-900 nm via a one-step method.

According to a preferred embodiment of the present application, the InP nanocrystal contains elements M, In and P, and M is a metal element. It is found by the inventor that compared with the InP nanocrystal phase composed of simple two single elements, In and P, the InP nanocrystal composed of elements M, In and P in the present application has less surface defects, and moreover, the luminescence center of the InP nanocrystal is free of heavy metal elements; therefore, the present application is more environmentally friendly and has a wide range of application.

In a specific embodiment, the component elements of the InP nanocrystal further include Zn; and the component elements of the prevent disclosure are not limited thereto.

According to a preferred embodiment of the present application, the InP nanocrystal is coated with a shell; and where the shell contains at least one of Zn element, S element and Se element. In a specific embodiments, the shell is at least one of ZnS, ZnSe and ZnSeS.

It is found by the inventor that the ZnS and/or ZnSe and/or ZnSeS shell grows on the surface of the InP nanocrystal, beneficial to obtaining an InP nanocrystal having better stability and more excellent optical properties.

The present application provides a preparation method of an red-emitting InP nanocrystal, including the following steps: S1, mixing the In precursor and P precursor with an organic solvent for reaction at a first temperature, and thermally insulating for a period of time to obtain an InP nanocrystal core solution; S2, rapidly heating the InP nanocrystal core solution up to a second temperature, and thermally insulating for a period of time; S3, adding a precursor substance demanded for the synthesis of a shell of the nanocrystal to the reaction system of the step S2 to obtain the red-emitting InP nanocrystal, where the red-emitting InP nanocrystal has a fluorescence emission peak within 580-670 nm.

According to a preferred embodiment of the present application, the first temperature ranges from 110-160° C.; preferably, the second temperature ranges from 280-340° C.

According to a preferred embodiment of the present application, in the S2, the InP nanocrystal core solution is rapidly heated up to the second temperature, keeping for at least 10 min.

According to a preferred embodiment of the present application, the time required for rapidly heating InP nanocrystal core solution up to the second temperature is controlled within 10 min. It is found by the inventor that the temperature of the reaction system is regulated to the second temperature within a time range of the above "rapidly heating", which is beneficial to the rapid aggregation and growth of the InP nanocrystal core, thus obtaining the nanocrystal having a uniform grain size.

The preparation method of the InP nanocrystal widely applied in the in the prior art is usually an injection method at high temperature, such that the In precursor and P precursor can be rapidly nucleated directly at high temperature and grow maturely, and then coated with shell as required, thus preparing the nanocrystal having a wavelength range of 520-720 nm. But, the injection method at high temperature difficultly balances the nucleation and growth process of the nanocrystal, such that the prepared nanocrystal has uneven size distribution and a broadened peak width at half height.

In the present application, the temperature of the step of mixing the In precursor and P precursor with the organic solvent for reaction is 120-160° C. It is found by the inventor that the InP nanocrystal core is prepared at a lower first temperature, which may control the nucleation and growth process of the nanocrystal, such that the prepared nanocrystal has even size distribution and broadened peak width at half height. In addition, the lower first temperature may further effectively avoid the risk that the surface of the InP nanocrystal core is oxidized, thus facilitating the growth process of the free monomer reactant on the surface of a seed crystal, such that the prepared InP nanocrystal has better optical properties.

In the present application, the above InP nanocrystal core solution is rapidly heated up to 280-320° C., keeping for at least 10 min. It is found by the inventor that the InP nanocrystal core further aggregate and grow at such a higher second temperature, and the grain size of the InP nanocrystal core in the system gradually increases, thus achieving the "curing process" of the InP nanocrystal core. Afterwards, the precursor substance demanded for the synthesis of the shell is added to the above mixed system containing the InP nanocrystal core, thus achieving the shell coating process of the nanocrystal, and finally obtaining the shell-coated red-emitting InP nanocrystal.

The technical means "low-temperature nucleation-rapidly heating up to boost the growth of the core-shell coating finally" is used in this present application; and firstly, the InP nanocrystal core is prepared at a lower first temperature, and a rapidly heating-up way is used to control the further aggregation and growth of the nanocrystal core, finally, a shell of the nanocrystal is formed on the surface of the nanocrystal core. Therefore, the method effectively balances the nucleation, growth and coating process of the InP nanocrystal by controlling the reaction temperature, thus obtaining an red-emitting InP nanocrystal having a shell structure and a fluorescence emission peak within 580-670 nm.

According to a preferred embodiment of the present application, the organic solvent is selected from at least one of saturated or unsaturated amines having a carbon number not lower than 6.

According to a preferred embodiment of the present application, the organic solvent is selected from at least one of primary amines and secondary amines. In a specific embodiment, the organic solvent is selected from at least one of hexylamine, heptyl amine, octylame, nonyl amine, decyl amine, decyl enamine, undecylamine, undecyl enamine, lauryl amine, dodecyl enamine, tridecyl amine, tridecyl enamine, tetradecylamine, tetradecyl enamine, pentadecanamine, pentadecyl enamine, cetylamine, cetyl enamine, heptadecyl amine, heptadecyl enamine, octadecylamine, octadecyl enamine.

According to a preferred embodiment of the present application, the P precursor has the chemical formula of $M\text{-}(O\text{---}C\equiv P)_n$, where, M is a metal element, and n is 1, 2 or 3. Further, when the element M is a monovalent metal element, such as Li, Na, K, Rb, Cs, n is 1. When the element M is a bivalent metal element, such as Zn, Ca, Mn, Sr, n is 2. When the element M is a trivalent metal element, such as Al, Ga, Tl, n is 3.

In the present application, it is found by the inventor that the P precursor $M\text{-}(O\text{---}C\equiv P)_n$ may further provide a metal element M, thus preparing a nanocrystal of an allay core composed of In, P and metal element M, thus further optimizing the optical property of the InP nanocrystal. In a specific embodiment, the P precursor $M\text{-}(O\text{---}C\equiv P)_n$ is Li—O—C≡P, Na—O—C≡P, K—O—C≡P, Zn—(O—C≡P)$_2$ or Ga—(O—C≡P)$_3$.

According to a preferred embodiment of the present application, the InP nanocrystal core solution contains a first Zn precursor. According to a preferred embodiment of the present application, the first Zn precursor is selected from a zinc halide. In a specific embodiment, the first Zn precursor is selected from at least one of zinc chloride, zinc bromide and zinc iodide.

It is found by the inventor that during the preparation of the InP nanocrystal core, a certain amount of Zn precursor is introduced into a reaction system, thus further reducing the surface defect of nanocrystal core and enhancing the energy level luminous efficiency of the nanocrystal.

According to a preferred embodiment of the present application, a ratio of the first Zn precursor to the In precursor is (0.01-10):1 according to a molar ratio. In a specific embodiment, a ratio of the first Zn precursor to the In precursor is (0.1-1):1 according to a molar ratio.

According to a preferred embodiment of the present application, the shell of the nanocrystal includes at least one of ZnS, ZnSe, and ZnSeS.

It is found by the inventor in the present application that the shell of the nanocrystal grows on the surface of the nanocrystal to significantly improve the luminous efficiency and photochemical stability of the nanocrystal. According to a preferred embodiment of the present application, the shell of the nanocrystal includes at least two layers, where, the at least two shells are adjacent and different from each other. In a specific embodiment, the shell of the nanocrystal includes two layers, where, the shell away from the InP nanocrystal core is ZnS; and the shell close to the InP nanocrystal core is ZnSe, or ZnSeS.

According to a preferred embodiment of the present application, the precusor substance demanded for the synthesis of the shell of the nanocrystal includes at least one of the second Zn precursor, S precursor and Se precursor In a specific embodiment, the second precursor is selected from zinc carboxylate, or an organic Zn reagent (the reagent where Zn is directly connected to an alkyl). Preferably, the second Zn precursor is selected from at least one of zinc acetate, zinc stearate, zinc oleate, zinc decylate, zinc undecylenate, zinc tetradecanoicate, zinc palmiticate, zinc diethyl-dithiocarbamate and diethyl zinc. In a specific embodiment, the S precursor is selected from at least one of alkylthiol, and a solution formed by dissolving elemental sulfur to a solvent. Preferably, the S precursor is selected from at least one of alkylthiol, trialkylphosphine sulfide, trivinylphosphonium sulfide, and S organic amine solution. Further preferably, the S precursor is selected from at least one of tri-n-butylphosphine sulfide, tri-octylphosphine sulfide, and S oleylamine solution. In a specific embodiment, the Se precursor is selected from the solution formed by dissolving elemental selenium to a solvent. Preferably, the Se precursor is selected from at least one of trialkylphosphine, trivinylphosphonium selenide, and a Se organic amine solution. Further preferably, the Se precursor is selected from at least one of tri-n-butyl phosphine selenide, tri-octylphosphine selenide, and Se oleylamine solution.

In the present application, it is found by the inventor that the above Zn precursor, S precursor, and Se precursor have a higher reaction activity, beneficial to coating a high-quality shell for the InP nanocrystal core. The above Zn, precursor, S precursor, and Se precursor serve the precursor substances demanded for the synthesis of the nanocrystal shell, so that the shell of the nanocrystal may grow more evenly, thus effectively improving the fluorescence quantum yield of the InP nanocrystal.

According to a preferred embodiment of the present application, the preparation method of the red-emitting InP nanocrystal further includes a step S4, heating up continuously, adding the precursor substance demanded for the synthesis of a shell of the nanocrystal to the S3 reaction system, thus obtaining the red-emitting InP nanocrystal; and the red-emitting InP nanocrystal has an emission peak within 580-670 nm. It is found by the inventor in the present application that the InP nanocrystal is coated with shells repeatedly according to the actual demands, such that the shells may be more evenly coated on the surface of the InP nanocrystal better, thus further improving the luminous efficiency and photochemical stability of the InP nanocrystal.

According to a preferred embodiment of the present application, the method further includes a step of removing unreacted raw materials and other impurities after obtaining the above InP nanocrystal, specifically including separation and purification, thus further improving the optical property of the prepared InP nanocrystal. These steps are common general methods in the art, and thus are not stated any more.

According to a preferred embodiment of the present application, provided is an red-emitting InP nanocrystal, and the red-emitting InP nanocrystal is prepared by the following steps: S1, mixing the In precursor and P precursor with an organic solvent for reaction at a first temperature to obtain an InP nanocrystal core solution; S2, rapidly heating the InP nanocrystal core solution up to a second temperature, and thermally insulating for a period of time; S3, adding a precursor substance demanded for the synthesis of a shell of the nanocrystal to the reaction system of the step S2 to obtain the red-emitting InP nanocrystal, where the red-emitting InP nanocrystal has a fluorescence emission peak within 580-670 nm.

According to a preferred embodiment of the present application, the first temperature ranges from 110-160° C. Further, the second temperature ranges from 280-340° C.

According to a preferred embodiment of the present application, in the S2, the InP nanocrystal core solution is rapidly heated up to the second temperature, keeping for at least 10 min.

According to a preferred embodiment of the present application, the organic solvent is at least one of saturated or unsaturated amines having a carbon number not lower than 6. According to a preferred embodiment of the present application, the organic solvent is selected from at least one of primary amines and secondary amines. In a specific embodiment, the organic solvent is selected from at least one of hexylamine, heptyl amine, octylame, nonyl amine, decyl amine, decyl enamine, undecylamine, undecyl enamine, lauryl amine, dodecyl enamine, tridecyl amine, tridecyl enamine, tetradecylamine, tetradecyl enamine, pentadecanamine, pentadecyl enamine, cetylamine, cetyl enamine, heptadecyl amine, heptadecyl enamine, octadecylamine, and octadecyl enamine.

According to a preferred embodiment of the present application, the P precursor has the chemical formula of M-(O—C≡P)$_n$, where, M is a metal element, and n is 1, 2 or 3. Further, when the element M is a monovalent metal element, such as Li, Na, K, Rb, Cs, n is 1. When the element M is a bivalent metal element, such as Zn, Ca, Mn, Sr, n is 2. When the element M is a trivalent metal element, such as Al, Ga, Tl, n is 3. In a specific embodiment, the P precursor M-(O—C≡P)$_n$ is Li—O—C≡P, Na—O—C≡P, K—O—C≡P, Zn—(O—C≡P)$_2$ or Ga—(O—C≡P)$_3$.

According to a preferred embodiment of the present application, the InP nanocrystal core solution contains a first Zn precursor. According to a preferred embodiment of the present application, the first Zn precursor is selected from a zinc halide. In a specific embodiment, the first Zn precursor is selected from at least one of zinc chloride, zinc bromide and zinc iodide.

According to a preferred embodiment of the present application, a ratio of the first Zn precursor to the In precursor is (0.01-10):1 according to a molar ratio. In a specific embodiment, a ratio of the first Zn precursor to the In precursor is (0.1-1):1 according to a molar ratio.

According to a preferred embodiment of the present application, the shell of the nanocrystal includes at least one of ZnS, ZnSe, and ZnSeS.

According to a preferred embodiment of the present application, the shell of the nanocrystal includes at least two layers, where, the at least two shells are adjacent and different from each other.

In a specific embodiment, the shell of the nanocrystal includes two layers, where, the shell away from the InP nanocrystal core is ZnS; and the shell close to the InP nanocrystal core is ZnSe, or ZnSeS.

According to a preferred embodiment of the present application, the red-emitting InP nanocrystal may further include the following steps: S1, mixing the In precursor and P precursor with an organic solvent for reaction at a first temperature to obtain an InP nanocrystal core solution; S2, rapidly heating the InP nanocrystal core solution up to a second temperature, and keeping for a period of time; S3, adding a precursor substance demanded for the synthesis of a shell of the nanocrystal to the reaction system of the step S2 to obtain the red-emitting InP nanocrystal, where the red-emitting InP nanocrystal has a fluorescence emission peak within 580-670 nm.

In the present application, it is found by the inventor that the red-emitting InP nanocrystal has excellent luminescence property, a small peak width at half height (≤50 nm) of the fluorescence emission peak, and a high fluorescence quantum yield (greater than 80%). The infrared InP synthesized in the prior art always has a large peak width at half height, low quantum yield and poor stability. By using a novel P precursor, an M element is doped in the core to improve the quantum yield; and the control of two-step temperature reduces the peak width at half height, such that the synthesized product has better performance.

The present application provides a preparation method of a cyan-emitting InP nanocrystal, including the following steps: S1, mixing the In precursor, optional Zn precursor, and P precursor M-(O—C≡P)$_n$ with an organic solvent for reaction at a first temperature to obtain an InP nanocrystal core solution; S2, adding a Zn cationic precursor to the InP nanocrystal core solution to form a first mixed solution at the first temperature; S3, adding a S or Se anionic precursor to the first mixed solution at a second temperature; where, the cationic precursor is reacted with the anionic precursor to coat a shell on the InP nanocrystal core, thus obtaining the cyan-emitting InP nanocrystal; the cyan-emitting InP nanocrystal has a fluorescence emission peak within 460-500 nm; and where, the second temperature is greater than the first temperature.

In a specific embodiment, the solution system containing the In precursor and P precursor is first heated up to 110-160° C., after thermal insulation for a period of time, a Zn cationic precursor is added, where, a ratio of the Zn cationic precursor to the In precursor in the step S1 is (8-40)1. Afterwards, the temperature is heated up to the second reaction temperature of 160-240° C.; and then a S or Se anionic precursor equimolar to Zn is added to obtain the solution system containing the InP nanocrystal.

According to a preferred embodiment of the present application, the first temperature ranges from 110-160° C. Preferably, the second temperature ranges from 160-200° C.

According to a preferred embodiment of the present application, the organic solvent is at least one of saturated or unsaturated amines having a carbon number not lower than 6 or carboxylic acids. In a specific embodiment, the organic solvent is selected from at least one of hexylamine, heptyl amine, octylame, nonyl amine, decyl amine, decyl enamine, undecylamine, undecyl enamine, lauryl amine, dodecyl enamine, tridecyl amine, tridecyl enamine, tetradecylamine, tetradecyl enamine, pentadecanamine, pentadecyl enamine, cetylamine, cetyl enamine, heptadecyl amine, heptadecyl enamine, octadecylamine, and octadecyl enamine.

According to a preferred embodiment of the present application, the P precursor has the chemical formula of M-(O—C≡P)$_n$, where, M is a metal element, n is a valence state of the element M, and n is 1, 2 or 3. In a specific embodiment, the P precursor M-(O—C≡P)$_n$ is Li—O—C≡P, Na—O—C≡P, K—O—C≡P, Zn—(O—C≡P)$_2$ or Ga—(O—C≡P)$_3$.

In the present application, M-(O—C≡P)$_n$ serves as a novel P precursor to synthesize the InP nanocrystal. The In precursor and M-(O—C≡P)$_n$ are mixed and heated up to the first reaction temperature to obtain the final InP nanocrystal core solution, then a shell is coated rapidly. Meanwhile, the P precursor M-(O—C≡P)$_n$ of the present application may further provide a metal element M, thus preparing a nanocrystal of an alloy core composed of In, P and metal element M, thus further optimizing the optical property of the InP nanocrystal.

According to a preferred embodiment of the present application, the InP nanocrystal core solution optionally contains a first Zn precursor, and the first Zn precursor is selected from a zinc halide. In a specific embodiment, the first Zn precursor is selected from at least one of zinc chloride, zinc bromide and zinc iodide. In a specific embodiment, the zinc source includes at least one of zinc acetate, zinc chloride, zinc carbonate, zinc decylate, zinc undecylenate, zinc stearate, zinc oleate and zinc diethyldithiocarbamate. It is found by the inventor that during the preparation of the InP nanocrystal core, a certain amount of Zn precursor is introduced into the reaction system, thus further reducing the surface defect of nanocrystal core and enhancing the energy level luminous efficiency of the nanocrystal.

According to a preferred embodiment of the present application, a ratio of the first Zn precursor to the In precursor is (3-20):1 according to a molar ratio. In a specific embodiment, a ratio of the first Zn precursor to the In precursor is (3-10):1 according to a molar ratio.

According to a preferred embodiment of the present application, a ratio of the Zn cationic precursor in the step S2 to the In precursor in the step S1 is (8-40):1 according to a molar ratio. In a specific embodiment, a ratio of the cationic precursor in the step S2 to the In precursor in the step S1 is (10-20):1 according to a molar ratio.

According to a preferred embodiment of the present application, the cationic precursor is a second Zn precursor. According to a preferred embodiment of the present application, the second Zn precursor is selected from an organic zinc reagent. In a specific embodiment, the second Zn precursor is selected from at least one of zinc acetate, zinc stearate, zinc oleate, zinc decylate, zinc undecylenate, zinc tetradecanoicate, zinc palmiticate, and diethyl zinc. According to a preferred embodiment of the present application, the anionic precursor is at least one of a S precursor and Se precursor. According to a preferred embodiment of the present application, the S precursor is selected from at least one of alkylthiol, and a solution formed by dissolving elemental sulfur to a solvent. According to a preferred embodiment of the present application, the S precursor is selected from at least one of alkylthiol, trialkylphosphine sulfide, trivinylphosphonium sulfide, and S organic amine solution. Preferably, the S precursor is selected from at least one of tri-n-butylphosphine sulfide, tri-octylphosphine sulfide, and S oleylamine solution. According to a preferred embodiment of the present application, the Se precursor is selected from the solution formed by dissolving elemental Se to a solvent. In a preferred embodiment of the present application, the Se precursor is selected from at least one of trialkylphosphine selenide, trivinylphosphonium selenide, and Se organic amine solution. Preferably, the Se precursor is selected from at least one of tri-n-butyl phosphine selenide, tri-octylphosphine selenide, and Se oleylamine solution.

In the present application, it is found by the inventor that the above S precursor, and Se precursor have a higher reaction activity, beneficial to coating a high-quality shell for the InP nanocrystal core. The above S precursor, and Se precursor serve as an anionic precursor, such that the shell of the nanocrystal may grow more evenly, thus effectively improving the fluorescence quantum yield of the InP nanocrystal.

According to a preferred embodiment of the present application, the preparation method of a cyan-emitting InP nanocrystal further includes a step S4, adding the cationic precusor and anionic precursor to the reaction system of the S3 once again, thus obtaining the cyan-emitting InP nanocrystal; and the cyan-emitting InP nanocrystal has a fluorescence emission peak within 460-500 nm. It is found by the inventor in the present application that the InP nanocrystal is coated with shells repeatedly, such that the shells may be more evenly coated on the surface of the InP nanocrystal, thus further improving the luminous efficiency and photochemical stability of the InP nanocrystal. According to a preferred embodiment of the present application, S4 is performed at a temperature of gradually increasing the reaction system.

According to a preferred embodiment of the present application, the method further includes the step of removing unreacted raw materials and other impurities after obtaining the above InP nanocrystal, specifically including separation and purification, thus further improving the optical property of the prepared InP nanocrystal. These steps are common general methods in the art, and thus are not stated any more.

According to a preferred embodiment of the present application, provided is a cyan-emitting InP nanocrystal, and the cyan-emitting InP nanocrystal, is prepared by the following steps: S1, mixing the In precursor and P precursor with an organic solvent for reaction at a first temperature to obtain an InP nanocrystal core solution; S2, adding a cationic precursor to the InP nanocrystal core solution to form a first mixed solution at the first temperature; S3, adding an anionic precursor to the first mixed solution at a second temperature; where, the cationic precursor is reacted with the anionic precursor to coat a shell on the InP nanocrystal core, thus obtaining the cyan-emitting InP nanocrystal; the cyan-emitting InP nanocrystal has a fluorescence emission peak within 460-500 nm; and where, the second temperature is greater than the first temperature.

According to a preferred embodiment of the present application, the first temperature ranges from 110-160° C. Preferably, the second temperature ranges from 160-200° C.

According to a preferred embodiment of the present application, the organic solvent is at least one of saturated or unsaturated amines having a carbon number not lower than 6. In a specific embodiment, the organic solvent is selected from at least one of hexylamine, heptyl amine, octylame, nonyl amine, decyl amine, decyl enamine, undecylamine, undecyl enamine, lauryl amine, dodecyl enamine, tridecyl amine, tridecyl enamine, tetradecylamine, tetradecyl enamine, pentadecanamine, pentadecyl enamine, cetylamine, cetyl enamine, heptadecyl amine, heptadecyl enamine, octadecylamine, and octadecyl enamine.

According to a preferred embodiment of the present application, the P precursor has the chemical formula of $M\text{-}(O\text{---}C\equiv P)_n$, where M is a metal element, n is a valence state of the element M, and n is 1, 2 or 3. Further, when the element M is a monovalent metal element, such as Li, Na, K, Rb, Cs, n is 1. When the element M is a bivalent metal element, such as Zn, Ca, Mn, Sr, n is 2. When the element M is a trivalent metal element, such as Al, Ga, Tl, n is 3. In a specific embodiment, the P precursor $M\text{-}(O\text{---}C\equiv P)_n$ is Li—O—C≡P, Na—O—C≡P, K—O—C≡P, $Zn\text{---}(O\text{---}C\equiv P)_2$ or $Ga\text{---}(O\text{---}C\equiv P)_3$.

According to a preferred embodiment of the present application, the InP nanocrystal core solution contains a first Zn precursor. According to a preferred embodiment of the present application, the first Zn precursor is selected from a zinc halide. In a specific embodiment, the first Zn precursor is selected from at least one of zinc chloride, zinc bromide and zinc iodide.

According to a preferred embodiment of the present application, a ratio of the first Zn precursor to the In precursor is (3-20):1 according to a molar ratio. In a specific embodiment, a ratio of the first Zn precursor to the In precursor is (3-10):1 according to a molar ratio. According to a preferred embodiment of the present application, a ratio of the cationic precursor in the step S2 to the In precursor in the step S1 is (8-40):1 according to a molar ratio. In a specific embodiment, a ratio of the cationic precursor in the step S2 to the In precursor in the step S1 is (10-20):1 according to a molar ratio.

According to a preferred embodiment of the present application, the cationic precursor is a second Zn precursor. According to a preferred embodiment of the present application, the second Zn precursor is selected from zinc carboxylate, or an organic Zn reagent. In a specific embodiment, the second Zn precursor is selected from at least one of zinc acetate, zinc stearate, zinc oleate, zinc decylate, zinc undecylenate, zinc tetradecanoicate, zinc palmiticate, and diethyl zinc.

According to a preferred embodiment of the present application, the anionic precursor is at least one of a S precursor and Se precursor. According to a preferred embodiment of the present application, the S precursor is selected from at least one of alkylthiol, and a solution formed by dissolving elemental sulfur to a solvent. According to a preferred embodiment of the present application, the S precursor is selected from at least one of alkylthiol, trialkylphosphine sulfide, trivinylphosphonium sulfide, and S organic amine solution. Preferably, the S precursor is selected from at least one of tri-n-butylphosphine sulfide, tri-octylphosphine sulfide, and S oleylamine solution. According to a preferred embodiment of the present application, the Se precursor is selected from the solution formed by dissolving elemental Se to a solvent. In a preferred embodiment of the present application, the Se precursor is selected from at least one of trialkylphosphine selenide, trivinylphosphonium selenide, and Se organic amine solution. Preferably, the Se precursor is selected from at least one of tri-n-butyl phosphine selenide, tri-octylphosphine selenide, and Se oleylamine solution.

According to a preferred embodiment of the present application, the cyan-emitting InP nanocrystal may further be prepared by the following steps: S1, mixing the In precursor and P precursor with an organic solvent for reaction at a first temperature to obtain an InP nanocrystal core solution; S2, adding a cationic precursor to the InP nanocrystal core solution to form a first mixed solution at the first temperature; S3, adding an anionic precursor to the first mixed solution at a second temperature; where, the cationic precursor is reacted with the anionic precursor to coat a shell on the InP nanocrystal core; S4, adding the cationic precursor and anionic precursor to the reaction system of the step S3 once again to obtain the cyan-emitting InP nanocrystal; where, the second temperature is greater than the first temperature.

According to a preferred embodiment of the present application, the InP nanocrystal has a fluorescence emission peak within 460-500 nm.

In the present application, it is found by the inventor that the InP nanocrystal has a high fluorescence quantum yield (greater than 50%), thus expanding the application scope of the InP nanocrystal. There are limited synthetic methods of the InP nanocrystal in the prior art, and the synthesized product has poor properties. By using a novel P precursor, the synthesis of the cyan-emitting InP nanocrystal becomes simple and efficient. Due to the doping of an element M, the product synthesized by the method has a controllable wavelength, high efficiency and narrow peak width at half height.

The preparation methods of some exemplary embodiments according to the present application will be described by reference to the following examples more specifically; and the exemplary embodiments of the present application are not thereto.

Preparation of a Near-Infrared InP Nanocrystal

Example 1

InP nanocrystal 1 consisted of three elements, In, P, and Na, and the shell was a double-layered shell composed of ZnSe and ZnS. A second solvent was methylbenzene.

The preparation procedure of the InP nanocrystal was as follows:

S1, 0.5 mmol indium chloride and 10 mL oleylamine were mixed at 25° C. to obtain a first solution system containing an In precursor; and 0.75 mmol NaOCP and 5 mL methylbenzene were mixed to obtain a second solution system containing a P precursor.

S2, the first solution system containing the In precursor was heated up to 200° C. under nitrogen exhaust condition, and then the second solution system containing the P precursor was added to obtain an In—P mixed solution system;

S3, the In—P mixed solution system in the step S2 was heated up to 280° C. for reaction for 60 min, thus obtaining a solution system containing the InP nanocrystal;

S4, the system was heated up to 310° C., then 24 mmol zinc acetate, and 6 mL Se-trioctylphosphine solution (2 mmol/mL) were added for reaction to obtain a ZnSe shell coated on the InP nanocrystal; afterwards, 6 mL S-trioctylphosphine solution (2 mmol/mL) to obtain a ZnS shell coated on the ZnSe shell.

S5, at the end of the reaction, separation and purification were performed to obtain an InP nanocrystal 1.

Example 2

InP nanocrystal 2 consisted of four elements, In, P, Na, and Zn, and the shell was a double-layered shell composed of ZnSe and ZnS. A second solvent was methylbenzene.

The preparation procedure of the InP nanocrystal was as follows:

S1, 0.5 mmol indium chloride, 2 mmol zinc chloride and 10 mL oleylamine were mixed at 30° C. to obtain a first solution system containing an In precursor; and 0.75 mmol NaOCP and 5 mL methylbenzene were mixed to obtain a second solution system containing a P precursor.

S2, the first solution system containing the In precursor was heated up to 200° C. under nitrogen exhaust condition, and then the second solution system containing the P precursor was added to obtain an In—P mixed solution system;

S3, the In—P mixed solution system in the step S2 was heated up to 280° C. for reaction for 60 min, thus obtaining a solution system containing the InP nanocrystal;

S4, the system was heated up to 310° C., then 24 mmol zinc acetate, and 6 mL Se-trioctylphosphine solution (2 mmol/mL) were added for reaction to obtain a ZnSe shell coated on the InP nanocrystal; afterwards, 6 mL S-trioctylphosphine solution (2 mmol/mL) to obtain a ZnS shell coated on the ZnSe shell.

S5, at the end of the reaction, separation and purification were performed to obtain an InP nanocrystal 2.

Example 3

InP nanocrystal 3 consisted of four elements, In, P, K, and Zn and the shell was a double-layered shell composed of ZnSe and ZnS. A second solvent was methylbenzene.

The preparation procedure of the InP nanocrystal was as follows:

S1, 0.5 mmol indium chloride, 2 mmol zinc chloride and 10 mL oleylamine were mixed at 25° C. to obtain a first solution system containing an In precursor; and 0.75 mmol KOCP and 5 mL methylbenzene were mixed to obtain a second solution system containing a P precursor.

S2, the first solution system was heated up to 200° C. under nitrogen exhaust condition, and then the second solution system containing the P precursor was added to obtain an In—P mixed solution system;

S3, the In—P mixed solution system in the step S2 was heated up to 280° C. for reaction for 60 min, thus obtaining a solution system containing the InP nanocrystal;

S4, the system was heated up to 310° C., then 24 mmol zinc acetate, and 6 mL Se-trioctylphosphine solution (2 mmol/mL) were added for reaction to obtain a ZnSe shell coated on the InP nanocrystal; afterwards, 6 mL S-trioctylphosphine solution (2 mmol/mL) to obtain a ZnS shell coated on the ZnSe shell.

S5, at the end of the reaction, separation and purification were performed to obtain an InP nanocrystal 3.

Example 4

InP nanocrystal 4 consisted of three elements, In, P, and K, and the shell was a double-layered shell composed of ZnSe and ZnS. A second solvent was methylbenzene.

The preparation procedure of the InP nanocrystal was as follows:

S1, 0.5 mmol indium chloride and 10 mL oleylamine were mixed at 25° C. to obtain a first solution system containing an In precursor; and 0.75 mmol KOCP and 5 mL methylbenzene were mixed to obtain a second solution system containing a P precursor.

S2, the first solution system containing the In precursor was heated up to 240° C. under nitrogen exhaust condition, and then the second solution system containing the P precursor was added to obtain an In—P mixed solution system;

S3, the In—P mixed solution system in the step S2 was heated up to 300° C. for reaction for 60 min, thus obtaining a solution system containing the InP nanocrystal;

S4, the system was heated up to 310° C., then 24 mmol zinc acetate, and 6 mL Se-trioctylphosphine solution (2 mmol/mL) were added for reaction to obtain a ZnSe shell coated on the InP nanocrystal; afterwards, 6 mL S-trioctylphosphine solution (2 mmol/mL) to obtain a ZnS shell coated on the ZnSe shell.

S5, at the end of the reaction, separation and purification were performed to obtain an InP nanocrystal 4.

Example 5

InP nanocrystal 5 consisted of three elements, In, P, and Na, and a second solvent was n-heptane.

The preparation procedure of the InP nanocrystal was as follows:

S1, 0.5 mmol indium chloride and 10 mL oleylamine were mixed at 25° C. to obtain a first solution system containing an In precursor; and 0.75 mmol NaOCP and 5 mL n-heptane were mixed to obtain a second solution system containing a P precursor.

S2, the first solution system containing the In precursor was heated up to 200° C. under nitrogen exhaust condition, and then the second solution system containing the P precursor was added to obtain an In—P mixed solution system;

S3, the In—P mixed solution system in the step S2 was heated up to 280° C. for reaction for 60 min, thus obtaining a solution system containing the InP nanocrystal;

S4, the system was heated up to 310° C., then 24 mmol zinc oleate, and 6 mL Se-trioctylphosphine solution (2 mmol/mL) were added for reaction to obtain a ZnSe shell coated on the InP nanocrystal; afterwards, 6 mL S-trioctylphosphine solution (2 mmol/mL) to obtain a ZnS shell coated on the ZnSe shell.

S5, at the end of the reaction, separation and purification were performed to obtain an InP nanocrystal 5.

Example 6

InP nanocrystal 6 consisted of three elements, In, P, and Na, and a second solvent was methylbenzene for nucleation at 240° C.

The preparation procedure of the InP nanocrystal was as follows:

S1, 0.5 mmol indium chloride and 10 mL oleylamine were mixed at 25° C. to obtain a first solution system containing an In precursor; and 0.75 mmol NaOCP and 5 mL methylbenzene were mixed to obtain a second solution system containing a P precursor.

S2, the first solution system containing the In precursor was heated up to 240° C. under nitrogen exhaust condition, and then the second solution system containing the P precursor was added to obtain an In—P mixed solution system;

S3, the In—P mixed solution system in the step S2 was heated up to 280° C. for reaction for 60 min, thus obtaining a solution system containing the InP nanocrystal;

S4, the system was heated up to 310° C., then 24 mmol zinc oleate, and 6 mL Se-trioctylphosphine solution (2 mmol/mL) were added for reaction to obtain a ZnSe shell coated on the InP nanocrystal; afterwards, 6 mL S-trioctylphosphine solution (2 mmol/mL) to obtain a ZnS shell coated on the ZnSe shell.

S5, at the end of the reaction, separation and purification were performed to obtain an InP nanocrystal 6.

Comparative Example 1

InP nanocrystal 7 consisted of three elements, In, P, and Na, and the shell was a double-layered shell composed of ZnSe and ZnS.

The preparation procedure of the InP nanocrystal was as follows:

S1, 0.5 mmol indium chloride and 10 mL oleylamine were mixed at 25° C. to obtain a first solution system containing an In precursor; and 0.75 mmol NaOCP and 5 mL oleylamine were mixed to obtain a second solution system containing a P precursor.

S2, the first solution system containing the In precursor was heated up to 240° C. under nitrogen exhaust condition, and then the second solution system containing the P precursor was added to obtain an In—P mixed solution system;

S3, the In—P mixed solution system in the step S2 was heated up to 300° C. for reaction for 60 min, thus obtaining a solution system containing the InP nanocrystal;

S4, the system was heated up, then 24 mmol zinc acetate, and 6 mL Se-trioctylphosphine (2 mmol/mL) were added for reaction to obtain a ZnSe shell coated on the InP nanocrystal; afterwards, 6 mL S-trioctylphosphine solution (2 mmol/mL) was added again for reaction to obtain a ZnS shell coated on the ZnSe shell.

S5, at the end of the reaction, separation and purification were performed to obtain an InP nanocrystal 7.

Comparative Example 2

InP nanocrystal 8 consisted of three elements In, Zn, and P, and the shell was a double-layered shell composed of ZnSe and ZnS.

The preparation procedure of the InP nanocrystal was as follows:

S1, 50 mg indium chloride, 150 mg zinc chloride were mixed with 3 mL oleylamine for thermal insulation for 1 h at 120° C. under a nitrogen exhaust condition.

S2, the system was heated up to 180° C., and tri(diethylamino)phosphine was injected rapidly for reaction for 60 min;

S3, 0.5 mL Se-tri-octylphosphine solution (1 mmol/mL) was added for reaction for 60 min to obtain a ZnSe shell coated on the InP nanocrystal.

S4, 500 mg zinc stearate, and 2 mL octadecene were added and heated up to 200° C. for reaction for 30 min, then 0.5 mL S-tri-octylphosphine solution (1 mmol/mL) to obtain a ZnS shell coated on the ZnSe shell.

S5, at the end of the reaction, separation and purification were performed to obtain an InP nanocrystal 8.

Comparative Example 3

InP nanocrystal 9 consisted of three elements In, P, and Na.

The preparation procedure of the InP nanocrystal was as follows:

S1, 0.5 mmol indium chloride and 10 mL oleylamine were mixed at 25° C. to obtain a first solution system containing an In precursor; and 0.75 mmol NaOCP and 5 mL methylbenzene were mixed to obtain a second solution system containing a P precursor.

S2, the first solution system containing the In precursor was heated up to 200° C. under nitrogen exhaust condition, and then the second solution system containing the P precursor was added to obtain an In—P mixed solution system;

S3, the In—P mixed solution system in the step S2 was heated up to 280° C. for reaction for 60 min, thus obtaining a solution system containing the InP nanocrystal;

S4, the system was heated up to 310° C., then 24 mmol zinc oleate, and 6 mL Se-trioctylphosphine (2 mmol/mL) were added for reaction to obtain a ZnSe shell coated on the InP nanocrystal; afterwards, 6 mL S-trioctylphosphine solution (2 mmol/mL) was added again for reaction to obtain a ZnS shell coated on the ZnSe shell.

S5, at the end of the reaction, separation and purification were performed to obtain an InP nanocrystal 9.

Comparative Example 4

InP nanocrystal 10 consisted of three elements In, Zn, and P.

The preparation procedure of the InP nanocrystal was as follows:

S1, 50 mg indium chloride, 150 mg zinc chloride were mixed with 3 mL oleylamine for thermal insulation for 1 h at 120° C. under a nitrogen exhaust condition.

S2, the system was heated up to 200° C., and tri(diethylamino)phosphine was injected rapidly for reaction for 60 min;

S3, the system was heated up to 310° C., then 24 mmol zinc oleate, and 6 mL Se-trioctylphosphine (2 mmol/mL) were added for reaction to obtain a ZnSe shell coated on the InP nanocrystal; afterwards, 6 mL S-trioctylphosphine solution (2 mmol/mL) was added again for reaction to obtain a ZnS shell coated on the ZnSe shell.

S5, at the end of the reaction, separation and purification were performed to obtain an InP nanocrystal 10.

In addition, the luminescent properties of the InP nanocrystal in examples 1-6 and comparative examples 1-4 were further tested. Test results were shown in the table below.

|  | Fluorescence emission peak PL (nm) | Peak width at half height (nm) |
|---|---|---|
| Example 1 | 755 | 132 |
| Example 2 | 720 | 140 |
| Example 3 | 775 | 147 |
| Example 4 | 855 | 185 |
| Example 5 | 780 | 150 |
| Example 6 | 825 | 161 |
| Comparative Example 1 | 580 | 62 |
| Comparative Example 2 | 825 (defect fluorescence) | — |
| Comparative Example 3 | 580 | 62 |
| Comparative Example 4 | 650 | 68 |

It can be seen from the above table that by the preparation method of the present application, the first solution system containing the Im precursor is mixed with the second organic solvent containing the P precursor for reaction. Moreover, the second organic solvent has a boiling point below the predetermined temperature, thus directly obtaining the InP nanocrystal having a wavelength range of 700-900 nm only via a one-step charging way, which achieves the application of the InP nanocrystal within the scope of near-infrared wavelength, and expands the application scope of the InP nanocrystal.

Preparation of an Red-Emitting InP Nanocrystal

Example 7

Preparation of the Red-Emitting InP Nanocrystal 11:

S1, obtaining the InP nanocrystal core solution: 1 mmol $InCl_3$, 0.5 mmol $ZnCl_2$, 20 mL oleylamine, and 1 mmol Na—O—C≡P were mixed for reaction for 30 min at 120° C., to obtain an InP nanocrystal core solution.

S2, growth of the InP nanocrystal core: the InP nanocrystal core solution in the step S1 was heated up to 300° C. for 10 min, and keeping for 30 min;

S3, coating a shell onto the InP nanocrystal core: 10 mmol zinc acetate and 10 mmol S oleylamine solution were added to the reaction system of the step S2 for reaction for 60 min, thus obtaining the red-emitting InP nanocrystal 11;

Example 8

Preparation of the Red-Emitting InP Nanocrystal 12:

S1, obtaining the InP nanocrystal core solution: 1 mmol $InCl_3$, 0.5 mmol $ZnCl_2$, 20 mL oleylamine, and 1 mmol Na—O—C≡P were mixed for reaction for 30 min at 120° C., to obtain an InP nanocrystal core solution.

S2, growth of the InP nanocrystal core solution: the InP nanocrystal core solution in the step S1 was heated up to 320° C. for 10 min, and keeping for 30 min;

S3, coating a shell onto the InP nanocrystal core: 10 mmol zinc acetate and 10 mmol S oleylamine solution were added to the reaction system of the step S2 for reaction 60 min, to obtain the red-emitting InP nanocrystal 12;

Example 9

Preparation of the Red-Emitting InP Nanocrystal 13:

S1, obtaining the InP nanocrystal core solution: 1 mmol InCl$_3$, 1 mmol ZnCl$_2$, 20 mL oleylamine, and 1 mmol Na—O—C≡P were mixed for reaction for 30 min at 140° C., to obtain an InP nanocrystal core solution.

S2, growth of InP nanocrystal core solution: the InP nanocrystal core solution in the step the S1 was heated up to 340° C. for 10 min, and keeping for 30 min;

S3, coating a shell onto the InP nanocrystal core: 10 mmol zinc acetate and 10 mmol S oleylamine solution were added to the reaction system of the step S2 for reaction 60 min, to obtain the red-emitting InP nanocrystal 13;

Example 10

Preparation of the red-emitting InP nanocrystal 14:

S1, obtaining the InP nanocrystal core solution: 1 mmol InCl$_3$, 0.5 mmol ZnCl$_2$, 20 mL oleylamine, and 1 mmol Na—O—C≡P were mixed for reaction for 30 min at 120° C., to obtain an InP nanocrystal core solution.

S2, growth of the InP nanocrystal core solution: the InP nanocrystal core solution in the step S1 was heated up to 300° C. for 10 min, and keeping for 30 min;

S3, the system was heated up to 310° C., then 24 mmol zinc oleate, and 6 mL Se-trioctylphosphine (2 mmol/mL) were added for reaction to obtain a ZnSe shell coated on the InP nanocrystal; afterwards, 6 mL S-trioctylphosphine solution (2 mmol/mL) was added again for reaction to obtain a ZnS shell coated on the ZnSe shell.

S4, at the end of the reaction, separation and purification were performed to obtain an InP nanocrystal 14.

Example 11

Preparation of the Red-Emitting InP Nanocrystal 15:

S1, obtaining the InP nanocrystal core solution: 1 mmol InCl$_3$, 0.5 mmol ZnCl$_2$, 20 mL oleylamine, and 1 mmol Na—O—C≡P were mixed for reaction for 30 min at 120° C., to obtain an InP nanocrystal core solution.

S2, growth of the InP nanocrystal core: the InP nanocrystal core solution in the step S1 was heated up to 320° C. for 10 min, and keeping for 30 min;

S3, the system was cooled to 310° C.; then 24 mmol zinc oleate, and 6 mL Se-trioctylphosphine (2 mmol/mL) were added for reaction to obtain a ZnSe shell coated on the InP nanocrystal; afterwards, 6 mL S-trioctylphosphine solution (2 mmol/mL) was added again for reaction to obtain a ZnS shell coated on the ZnSe shell.

S4, at the end of the reaction, separation and purification were performed to obtain an InP nanocrystal 15.

Example 12

Preparation of the Red-Emitting InP Nanocrystal 16:

S1, obtaining the InP nanocrystal core solution: 1 mmol InCl$_3$, 1 mmol ZnCl$_2$, 20 mL oleylamine, and 1 mmol Na—O—C≡P were mixed for reaction for 30 min at 140° C., to obtain an InP nanocrystal core solution.

S2, growth of InP nanocrystal core: the InP nanocrystal core solution in the step S1 was heated up to 340° C. for 10 min, and keeping for 30 min;

S3, the system was cooled to 310° C.; then 24 mmol zinc oleate, and 6 mL Se-trioctylphosphine (2 mmol/mL) were added for reaction to obtain a ZnSe shell coated on the InP nanocrystal; afterwards, 6 mL S-trioctylphosphine solution (2 mmol/mL) was added again for reaction to obtain a ZnS shell coated on the ZnSe shell.

S4, at the end of the reaction, separation and purification were performed to obtain an InP nanocrystal 16.

Example 13

Preparation of the Red-Emitting InP Nanocrystal 17:

S1, obtaining the InP nanocrystal core solution: 1 mmol InCl$_3$, 1 mmol ZnCl$_2$, 20 mL oleylamine, and 1 mmol K—O—C≡P were mixed for reaction for 30 min at 140° C., to obtain an InP nanocrystal core solution.

S2, growth of the InP nanocrystal core: the InP nanocrystal core solution in the step S1 was heated up to 340° C. for 10 min, and keeping for 30 min;

S3, the system was cooled to 310° C.; then 24 mmol zinc oleate, and 6 mL Se-trioctylphosphine (2 mmol/mL) were added for reaction to obtain a ZnSe shell coated on the InP nanocrystal; afterwards, 6 mL S-trioctylphosphine solution (2 mmol/mL) was added again for reaction to obtain a ZnS shell coated on the ZnSe shell.

S4, at the end of the reaction, separation and purification were performed to obtain an InP nanocrystal 17.

Example 14

Preparation of the Red-Emitting InP Nanocrystal 18:

S1, obtaining the InP nanocrystal core solution: 1 mmol InCl$_3$, 20 mL oleylamine, and 1 mmol K—O—C≡P were mixed for reaction for 30 min at 140° C., to obtain an InP nanocrystal core solution.

S2, growth of InP nanocrystal core: the InP nanocrystal core solution in the step S1 was heated up to 340° C. for 10 min, and keeping for 30 min;

S3, the system was cooled to 310° C.; then 24 mmol zinc oleate, and 6 mL Se-trioctylphosphine (2 mmol/mL) were added for reaction to obtain a ZnSe shell coated on the InP nanocrystal; afterwards, 6 mL S-trioctylphosphine solution (2 mmol/mL) was added again for reaction to obtain a ZnS shell coated on the ZnSe shell.

S4, at the end of the reaction, separation and purification were performed to obtain an InP nanocrystal 18.

Comparative Example 5

Preparation of the Red-Emitting InP Nanocrystal 19:

S1, obtaining the InP nanocrystal core solution: 1 mmol InCl$_3$, 5 mmol ZnCl$_2$, 10 mL oleylamine were mixed and heated for reaction; after vacuumizing, an inert gas is added; then 4 mmol tri(diethylamino)phosphine was added at 300° C. and reacted for 30 min to obtain the InP nanocrystal core solution.

S2, coating a shell onto the octadecyl InP nanocrystal core: 6 mmol octadecene solution of zinc stearate was added to the InP nanocrystal core solution in the step S1, and then 6 mmol trioctylphosphine sulfide solution for reaction 60 min to obtain the InP nanocrystal core solution 19.

Comparative Example 6

Preparation of the Red-Emitting InP Nanocrystal 20:

S1, obtaining the InP nanocrystal core solution: 1 mmol $InCl_3$, 1 mmol $ZnCl_2$, 20 mL oleylamine, and 1 mmol Na—O—C≡P were mixed under an inert gas atmosphere, and heated up to 340° C. within 10 min for thermal insulation for 30 min;

S2, the system was cooled to 310° C.; then 24 mmol zinc oleate, and 6 mL Se-trioctylphosphine (2 mmol/mL) were added for reaction to obtain a ZnSe shell coated on the InP nanocrystal; afterwards, 6 mL S-trioctylphosphine solution (2 mmol/mL) was added again for reaction to obtain a ZnS shell coated on the ZnSe shell.

S3, at the end of the reaction, separation and purification were performed to obtain an InP nanocrystal 20.

Comparative Example 7

Preparation of the Red-Emitting InP Nanocrystal 21:

S1, obtaining the InP nanocrystal core solution: 1 mmol $InCl_3$, 1 mmol $ZnCl_2$, 20 mL oleylamine, and 4 mmol tris(diethylamino)phosphine were mixed under an inert gas atmosphere for reaction for 30 min at 140° C., to obtain an InP nanocrystal core solution.

S2, growth of InP nanocrystal core: the InP nanocrystal core solution in the step S1 was heated up to 340° C. for 10 min, and keeping for 30 min;

S3, the system was cooled to 310° C.; then 24 mmol zinc oleate, and 6 mL Se-trioctylphosphine (2 mmol/mL) were added for reaction to obtain a ZnSe shell coated on the InP nanocrystal; afterwards, 6 mL S-trioctylphosphine solution (2 mmol/mL) was added again for reaction to obtain a ZnS shell coated on the ZnSe shell.

S4, at the end of the reaction, separation and purification were performed to obtain an InP nanocrystal 21.

Test representation: the red-emitting InP nanocrystals obtained from examples 7-14, and InP nanocrystal obtained from examples 5-7 were respectively dispersed into a methylbenzene to test the fluorescence spectrum and fluorescence quantum yield. The specific test results were shown in the table below.

| Sample | | Fluorescence emission peak PL (nm) | Peak width at half height of the fluorescence emission peak WHM/nm | Fluorescence quantum yield QY/% |
|---|---|---|---|---|
| Example 7 | Nanocrystal 11 | 580 | 45 | 81 |
| Example 8 | Nanocrystal 12 | 615 | 48 | 86 |
| Example 9 | Nanocrystal 13 | 661 | 50 | 85 |
| Example 10 | Nanocrystal 14 | 632 | 45 | 81 |
| Example 11 | Nanocrystal 15 | 635 | 42 | 82 |
| Example 12 | Nanocrystal 16 | 621 | 42 | 76 |
| Example 13 | Nanocrystal 17 | 610 | 62 | 56 |
| Example 14 | Nanocrystal 18 | 658 | 76 | 43 |
| Comparative Example 5 | Coronavirus 19 | 592 | 75 | 34 |
| Comparative Example 6 | Nanocrystal 20 | 652 | 70 | 32 |
| Comparative Example 7 | Nanocrystal 21 | 662 | 85 | 15 |

It can be seen from the above table that compared with the control group, the InP nanocrystal of the present application has a small peak width at half height of the fluorescence emission peak, and high fluorescence quantum yield, which provides that the InP nanocrystal obtained by the preparation method of the present application has excellent luminescence properties, thus expanding the application range of the InP nanocrystal.

Preparation of InP Nanocrystal

Example 15

The InP nanocrystal consisted of three elements In, P, Li, and the shell was a double-layered shell composed of ZnSe and ZnS.

The preparation procedure of the InP nanocrystal was as follows:

S1, 0.5 mmol indium chloride, 0.75 mmol Li—O—C≡P, and 10 mL oleylamine were mixed at 25° C. to obtain a first solution system.

S2, the first solution system was heated up to 180° C. under a nitrogen exhaust condition for reaction for 60 min, to obtain a solution system containing the nanocrystal;

S3, the system was heated up, then 24 mmol zinc stearate, and 6 mL Se-trioctylphosphine solution (2 mmol/mL) were added for reaction to obtain a ZnSe shell coated on the InP nanocrystal; afterwards, 6 mL S-trioctylphosphine solution (2 mmol/mL) was added for reaction to obtain a ZnS shell coated on the ZnSe shell.

S4, at the end of the reaction, separation and purification were performed to obtain a nanocrystal.

Example 16

The InP nanocrystal consisted of three elements In, P, Na and the shell was a double-layered shell composed of ZnSe and ZnS.

The preparation procedure of the InP nanocrystal was as follows:

S1, 0.5 mmol indium chloride, 0.75 mmol Na—O—C≡P, and 10 mL oleylamine were mixed at 25° C. to obtain a first solution system.

S2, the first solution system was heated up to 180° C. under nitrogen exhaust condition for reaction for 60 min, to obtain a solution system containing the nanocrystal;

S3, the system was heated up, then 24 mmol zinc stearate, and 6 mL Se-trioctylphosphine solution (2 mmol/mL) were added for reaction to obtain a ZnSe shell coated on the InP nanocrystal; afterwards, 6 mL S-trioctylphosphine solution (2 mmol/mL) was added for reaction to obtain a ZnS shell coated on the ZnSe shell.

S4, at the end of the reaction, separation and purification were performed to obtain a nanocrystal.

Example 17

The InP nanocrystal consisted of three elements In, P, Na and the shell was a double-layered shell composed of ZnSe and ZnS.

The preparation procedure of the InP nanocrystal was as follows:

S1, 0.5 mmol indium chloride, 0.75 mmol Zn—(O—C≡P)$_2$, and 10 mL oleylamine were mixed at 25° C. to obtain a first solution system.

S2, the first solution system was heated up to 180° C. under nitrogen exhaust condition for reaction for 60 min, to obtain a solution system containing the nanocrystal;

S3, the system was heated up, then 24 mmol zinc stearate, and 6 mL Se-trioctylphosphine solution (2 mmol/mL) were added for reaction to obtain a ZnSe shell coated on the InP nanocrystal; afterwards, 6 mL S-trioctylphosphine solution (2 mmol/mL) was added for reaction to obtain a ZnS shell coated on the ZnSe shell.

S4, at the end of the reaction, separation and purification were performed to obtain a nanocrystal.

Example 18

The InP nanocrystal consisted of three elements In, P, Ga and the shell was a double-layered shell composed of ZnSe and ZnS.

The preparation procedure of the InP nanocrystal was as follows:

S1, 0.5 mmol indium chloride, 0.75 mmol Ga—(O—C≡P)$_3$, and 10 mL oleylamine were mixed at 25° C. to obtain a first solution system.

S2, the first solution system was heated up to 180° C. under nitrogen exhaust condition for reaction for 60 min, to obtain a solution system containing the nanocrystal core;

S3, the system was heated up, then 24 mmol zinc stearate, and 6 mL Se-trioctylphosphine solution (2 mmol/mL) were added for reaction to obtain a ZnSe shell coated on the InP nanocrystal; afterwards, 6 mL S-trioctylphosphine solution (2 mmol/mL) was added for reaction to obtain a ZnS shell coated on the ZnSe shell.

S4, at the end of the reaction, separation and purification were performed to obtain a nanocrystal.

Example 19

InP nanocrystal consisted of four elements, In, P, Na, and Zn, and the shell was a double-layered shell composed of ZnSe and ZnS.

The preparation procedure of the InP nanocrystal was as follows:

S1, 0.5 mmol indium chloride, 4.0 mmol zinc chloride, 0.75 mmol Na—O—C≡P and 10 mL oleylamine were mixed at 25° C. to obtain a first solution system.

S2, the first solution system was heated up to 180° C. under a nitrogen exhaust condition for reaction for 60 min, to obtain a solution system containing the nanocrystal core;

S3, the system was heated up, then 24 mmol zinc acetate, and 6 mL Se-trioctylphosphine solution (2 mmol/mL) were added for reaction to obtain a ZnSe shell coated on the InP nanocrystal; afterwards, 6 mL S-trioctylphosphine solution (2 mmol/mL) was added for reaction to obtain a ZnS shell coated on the ZnSe shell.

S4, at the end of the reaction, separation and purification were performed to obtain a nanocrystal.

Comparative Example 8

The InP nanocrystal consisted of three elements In, P, Li, and the shell was a double-layered shell composed of ZnSe and ZnS.

The preparation procedure of the InP nanocrystal was as follows:

S1, 0.15 mmol indium acetate, 0.1 mmol lithium acetate, 0.1 mmol tri (trimethylsiloxane) phosphine (dispersed into 1 mL TOP), 0.3 mmol tetradecanoic acid and 10 mL octadecene were mixed for thermal insulation at 180° C. under nitrogen exhaust condition for reaction for 60 min, thus obtaining the solution system containing the nanocrystal core.

S2, the system was heated up, then 24 mmol zinc acetate, and 6 mL Se-trioctylphosphine solution (2 mmol/mL) were added for reaction to obtain a ZnSe shell coated on the InP nanocrystal; afterwards, 6 mL S-trioctylphosphine solution (2 mmol/mL) was added for reaction to obtain a ZnS shell coated on the ZnSe shell.

S3, at the end of the reaction, separation and purification were performed to obtain a nanocrystal.

Comparative Example 9

The InP nanocrystal consisted of three elements In, P, Na and the shell was a double-layered shell composed of ZnSe and ZnS.

The preparation procedure of the InP nanocrystal was as follows:

S1, 0.15 mmol indium acetate, 0.1 mmol sodium acetate, 0.1 mmol tri (trimethylsiloxane) phosphine (dispersed into 1 mL TOP), 0.3 mmol tetradecanoic acid and 10 mL octadecene were mixed for thermal insulation at 180° C. under a nitrogen exhaust condition for reaction for 60 min, thus obtaining the solution system containing the nanocrystal core.

S2, the system was heated up, then 24 mmol zinc acetate, and 6 mL Se-trioctylphosphine solution (2 mmol/mL) were added for reaction to obtain a ZnSe shell coated on the InP nanocrystal; afterwards, 6 mL S-trioctylphosphine solution (2 mmol/mL) was added for reaction to obtain a ZnS shell coated on the ZnSe shell.

S3, at the end of the reaction, separation and purification were performed to obtain a nanocrystal.

Comparative Example 10

The InP nanocrystal consisted of three elements In, P, Na and the shell was a double-layered shell composed of ZnSe and ZnS.

The preparation procedure of the InP nanocrystal was as follows:

S1, 0.15 mmol indium acetate, 0.1 mmol zinc acetate, 0.1 mmol tri (trimethylsiloxane) phosphine (dispersed into 1 mL TOP), 0.3 mmol tetradecanoic acid and 10 mL octadecene were mixed for thermal insulation at 180° C. under a nitrogen exhaust condition for reaction for 60 min, thus obtaining the solution system containing the nanocrystal core.

S2, the system was heated up, then 24 mmol zinc acetate, and 6 mL Se-trioctylphosphine solution (2 mmol/mL) were added for reaction to obtain a ZnSe shell coated on the InP nanocrystal; afterwards, 6 mL S-trioctylphosphine solution (2 mmol/mL) was added for reaction to obtain a ZnS shell coated on the ZnSe shell.

S3, at the end of the reaction, separation and purification were performed to obtain a nanocrystal.

Comparative Example 11

InP nanocrystal consisted of three elements In, P, Ga and the shell was a double-layered shell composed of ZnSe and ZnS.

The preparation procedure of the InP nanocrystal was as follows:

S1, 0.15 mmol indium acetate, 0.1 mmol gallium acetate, 0.1 mmol tri (trimethylsiloxane) phosphine (dispersed into 1 mL TOP), 0.3 mmol tetradecanoic acid and 10 mL octadecene were mixed for thermal insulation at 180° C. under nitrogen exhaust condition for reaction for 60 min, thus obtaining the solution system containing the nanocrystal core.

S2, the system was heated up, then 24 mmol zinc acetate, and 6 mL Se-trioctylphosphine solution (2 mmol/mL) were added for reaction to obtain a ZnSe shell coated on the InP nanocrystal; afterwards, 6 mL S-trioctylphosphine solution (2 mmol/mL) was added for reaction to obtain a ZnS shell coated on the ZnSe shell.

S3, at the end of the reaction, separation and purification were performed to obtain a nanocrystal.

Figure 2:
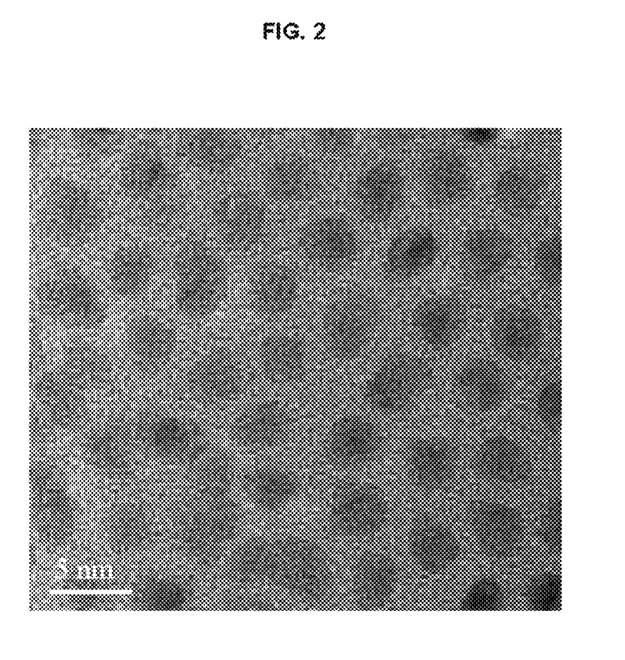
FIG. 2 shows a transmission electron microscopy (TEM) of a nanocrystal in example 15.

FIG. 2 shows a transmission electron microscopy (TEM) of the InP nanocrystal prepared in example 15; and it can be seen from the figure that the InP nanocrystal had a size about 3.5 nm.

Figure 3:
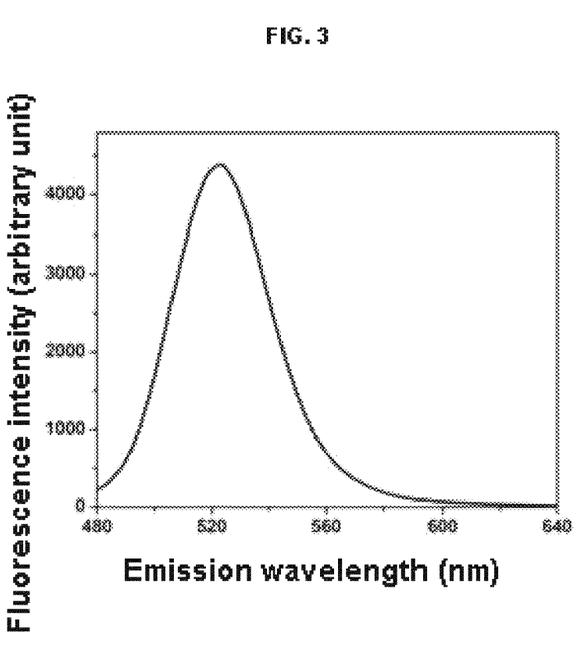
FIG. 3 shows a fluorescence emission spectrum of the nanocrystal in example 15.

FIG. 3 shows fluorescence emission spectrum of the InP nanocrystal in example 15, and the fluorescence emission peak was about 527 nm, and the peak width at half height was about 37 nm.

In addition, the luminescent properties of the InP nanocrystal in examples 15-19 and comparative examples 8-11 were further tested. Test test results were shown in the table below:

| | Peak wavelength (nm) | Peak width at half height (nm) | Quantum yield (%) |
|---|---|---|---|
| Example 15 | 527 | 37 | 61 |
| Example 16 | 531 | 38 | 73 |
| Example 17 | 525 | 36 | 74 |
| Example 18 | 521 | 40 | 75 |
| Example 19 | 530 | 38 | 75 |
| Comparative Example 8 | 528 | 43 | 41 |
| Comparative Example 9 | 533 | 45 | 38 |
| Comparative Example 10 | 524 | 42 | 43 |
| Comparative Example 11 | 523 | 46 | 36 |

It can be seen from the table above that $M-(O-C\equiv P)_n$ is used as a reaction precursor of elements M and P; compared with the single use of M precursor and P precursor, the prepared InP quantum dot had a basically same emission peak wavelength, an obviously reduced peak width at half height, and obviously increased quantum yield; for example: if example 15 was compared to example 18, the peak width at half height reduced 6 nm, and the quantum yield increased 20%; if example 16 was compared to example 9, the peak width at half height reduced 7 nm, and the quantum yield increased 35%; if example 17 was compared to example 10, the peak width at half height reduced 6 nm, and the quantum yield increased 31%; and if example 18 was compared to example 11, the peak width at half height reduced 6 nm, and the quantum yield increased 39%

Preparation of a Cyan-Emitting InP Nanocrystal

Example 20

Preparation of a Cyan-Emitting InP Nanocrystal 1:

S1, obtaining the InP nanocrystal core solution: 1 mmol InCl$_3$, 5 mmol ZnCl$_2$, 25 mL oleylamine, and 1 mmol Na—O—C≡P were mixed for reaction for 60 min at 120° C., to obtain an InP nanocrystal core solution.

S2, coating a shell on the octadecyl InP nanocrystal core: S2-1, 10 mmol zinc stearate was added to the InP nanocrystal core solution in the step S1 at 120° C. for reaction 30 min to form a firsted mixed solution; S2-2, the system was heated up to 160° C., and then 10 mmol S oleylamine solution was added to the first mixed solution of step S2-1 for reaction 60 min to obtain the cyan-emitting InP nanocrystal 1.

Example 21

Preparation of a Cyan-Emitting InP Nanocrystal 2:

S1, obtaining the InP nanocrystal core solution: 1 mmol InCl$_3$, 5 mmol ZnCl$_2$, 25 mL oleylamine, and 1 mmol Na—O—C≡P were mixed for reaction for 60 min at 120° C., to obtain an InP nanocrystal core solution.

S2, coating a shell on the octadecyl InP nanocrystal core: S2-1, 8 mmol zinc stearate was added to the InP nanocrystal core solution in the step S1 at 120° C. for reaction 30 min to form a first mixed solution; S2-2, the system was heated up to 160° C., and then 4 mmol tri-octylphosphine selenide solution and 4 mmol trioctylphosphine sulfide solution were added to the first mixed solution in the step S2-1 for reaction 60 min to form a second mixed solution; S2-3, the system was heated up to 200° C., and 6 mmol zinc acetate was added to the second mixed solution of step S2-2, then 6 mmol N-dodecyl mercaptan was added for reaction for 60 min; S2-4, the temperature of the reaction system was increased for the growth of ZnS shells for three times, thus obtaining the cyan-emitting InP nanocrystal 2.

Example 22

Preparation of a Cyan-Emitting InP Nanocrystal 3:

S1, obtaining the InP nanocrystal core solution: 1 mmol InCl$_3$, 10 mmol ZnCl$_2$, 25 mL oleyla mine, and 1 mmol Na—O—C≡P were mixed under inert gas atmosphere for reaction for 60 min at 120° C., thus obtaining an InP nanocrystal core solution.

S2, coating a shell on the InP nanocrystal: S2-1, 12 mmol diethyl zinc was added to the InP nanocrystal core solution in the step S1 at 120° C. for reaction 30 min to form a first mixed solution; S2-2, the system was heated up to 160° C., and then 12 mmol Se oleylamine solution was added to the first mixed solution of step the S2-1 for reaction 30 min to form a second mixed solution; S2-3, the system was heated up to 180° C., and 6 mmol zinc oleate was added to the second mixed solution of step S2-2, then 6 mmol N-dodecyl mercaptan was added for reaction for 60 min; S2-4, the temperature of the reaction system was gradually increased for the growth of ZnS shells for three times, thus obtaining the cyan-emitting InP nanocrystal 3.

Example 23

Preparation of a Cyan-Emitting InP Nanocrystal 4:

InP nanocrystal core consisted of three elements In, P, and Na, and the shell was ZnS.

S1, obtaining the InP nanocrystal core solution: 1 mmol $InCl_3$, 5 mmol $ZnCl_2$, 25 mL oleylamine, and 1 mmol Na—O—C≡P were mixed for reaction for 60 min at 120° C., to obtain an InP nanocrystal core solution.

S2, coating a shell on the octadecyl InP nanocrystal core: S2-1, 10 mmol zinc stearate was added to the InP nanocrystal core solution in the step S1 at 120° C. for reaction 30 min to form a first mixed solution; S2-2, the system was heated up to 160° C., and then 10 mmol S oleyla mine solution was added to the first mixed solution of the step S2-1 for reaction 60 min; S2-3, the system was heated up to 240° C., then 24 mmol zinc acetate, and 12 mL S-trioctylphosphine solution (2 mmol/mL) were added for reaction to obtain a ZnSe shell coated on the ZnS shell; S2-4, at the end of the reaction, separation and purification were performed to obtain a cyan-emitting InP nanocrystal 4.

Example 24

Preparation of a Cyan-Emitting InP Nanocrystal 5:

InP nanocrystal core consisted of three elements In, P, K, and the shell was ZnS.

S1, obtaining the InP nanocrystal core solution: 1 mmol $InCl_3$, 5 mmol $ZnCl_2$, 25 mL oleylamine, and 1 mmol K—O—C≡P were mixed for reaction for 60 min at 120° C., to obtain an InP nanocrystal core solution.

S2, coating a shell on the InP nanocrystal core: S2-1, 10 mmol zinc stearate was added to the InP nanocrystal core solution in the step S1 at 120° C. for reaction 30 min to form a firsted mixed solution; S2-2, the system was heated up to 160° C., and then 10 mmol S oleyla mine solution was added to the first mixed solution of step S2-1 for reaction 60 min; S2-3, the system was heated up to 240° C., then 24 mmol zinc acetate, and 12 mL S-trioctylphosphine solution (2 mmol/mL) were added for reaction to obtain a ZnSe shell coated on the ZnS shell; S2-4, at the end of the reaction, separation and purification were performed to obtain a cyan-emitting InP nanocrystal 5.

Example 25

Preparation of a Cyan-Emitting InP Nanocrystal 6:

InP nanocrystal core consisted of three elements In, P, and Na, the first shell was ZnSeS, and the second shell was ZnS.

S1, obtaining the InP nanocrystal core solution: 1 mmol $InCl_3$, 5 mmol $ZnCl_2$, 25 mL oleylamine, and 1 mmol Na—O—C≡P were mixed for reaction for 60 min at 120° C., to obtain an InP nanocrystal core solution.

S2, coating a shell on the InP nanocrystal core: S2-1, 8 mmol zinc stearate was added to the InP nanocrystal core solution in the step S1 at 120° C. for reaction 30 min to form a first mixed solution; S2-2, the system was heated up to 160° C., and then 4 mmol tri-octylphosphine selenide solution and 4 mmol tri-octylphosphine sulfide solution were added to the first mixed solution in the step S2-1 for reaction 30 min to obtain a second mixed solution; S2-3, the system was heated up to 240° C., and 6 mmol zinc acetate was added to the second mixed solution of step S2-2, and then 6 mmol n-dodecyl mercaptan was added for reaction for 60 min; S2-4, at the end of the reaction, separation and purification were performed to obtain a cyan-emitting InP nanocrystal 6.

Example 26

Preparation of a Cyan-Emitting InP Nanocrystal 7:

InP nanocrystal core consisted of three elements In, P, and K, the first shell was ZnSeS, and the second shell was ZnS.

S1, obtaining the InP nanocrystal core solution: 1 mmol $InCl_3$, 5 mmol $ZnCl_2$, 25 mL oleylamine, and 1 mmol Na—O—C≡P were mixed under inert gas atmosphere for reaction for 60 min at 120° C., to obtain an InP nanocrystal core solution.

S2, coating a shell on the InP nanocrystal core: S2-1, 8 mmol zinc stearate was added to the InP nanocrystal core solution in the step S1 at 120° C. for reaction 30 min to form a first mixed solution; S2-2, the system was heated up to 160° C., and then 4 mmol tri-octylphosphine selenide solution and 4 mmol tri-octylphosphine sulfide solution were added to the first mixed solution in the step S2-1 for reaction 30 min to obtain a second mixed solution; S2-3, the system was heated up to 240° C., and 6 mmol zinc acetate was added to the second mixed solution of step S2-2, and then 6 mmol n-dodecyl mercaptan was added for reaction for 60 min; S2-4, at the end of the reaction, separation and purification were performed to obtain a cyan-emitting InP nanocrystal 7.

Comparative Example 12

S1, obtaining the InP nanocrystal core solution: 1 mmol $InCl_3$, 8 mmol $ZnI_2$, 25 mL oleylamine, and 1 mmol Na—O—C≡P were mixed under inert gas atmosphere for reaction for 60 min at 120° C., to obtain an InP nanocrystal core solution.

S2, coating a shell on the octadecyl InP nanocrystal core: octadecene solution of 6 mmol zinc stearate was added to the InP nanocrystal core solution in the step S1, and then 6 mmol trioctylphosphine sulfide solution was added for reaction 60 min.

S3, at the end of the reaction, separation and purification were performed to obtain a nanocrystal 30.

Comparative Example 13

S1, obtaining the InP nanocrystal core solution: 1 mmol $InCl_3$, 8 mmol $ZnI_2$, 25 mL oleyla mine, and 1 mmol K—O—C≡P were mixed under inert gas atmosphere for reaction for 60 min at 120° C., to obtain an InP nanocrystal core solution.

S2, coating a shell on the InP nanocrystal core: octadecene solution of 6 mmol zinc stearate was added to the InP nanocrystal core solution in the step S1, and then 6 mmol trioctylphosphine sulfide solution was added for reaction 60 min.

S3, at the end of the reaction, separation and purification were performed to obtain a nanocrystal 31.

Comparative Example 14

S1, obtaining the InP nanocrystal core solution: 1 mmol $InCl_3$, 8 mmol $ZnI_2$, 25 mL oleylamine, and 4 mmol tris (diethylamino)phosphine were mixed under an inert gas atmosphere for reaction for 60 min at 120° C., to obtain an InP nanocrystal core solution.

S2, coating a shell on the InP nanocrystal core: octadecene solution of 6 mmol zinc stearate was added to the InP nanocrystal core solution in the step S1, and then 6 mmol trioctylphosphine sulfide solution was added for reaction 60 min.

S3, at the end of the reaction, separation and purification were performed to obtain a nanocrystal.

Test representation: the cyan-emitting InP nanocrystals obtained from examples 20-26, and InP nanocrystals obtained from comparative examples 12-14 were respectively dispersed into a methylbenzene solution to test the fluorescence spectrum and fluorescence quantum yield thereof. The specific test results were shown in the table below.

|  | Fluorescence emission peak PL (nm) | Peak width at half height PL/nm | Fluorescence quantum yield QY/% |
|---|---|---|---|
| Example 20 | 489 | 40 | 54 |
| Example 21 | 483 | 42 | 63 |
| Example 22 | 469 | 42 | 62 |
| Example 23 | 489 | 42 | 54 |
| Example 24 | 483 | 45 | 63 |
| Example 25 | 469 | 42 | 62 |
| Example 26 | 476 | 41 | 56 |
| Comparative Example 12 | 516 | 42 | 45 |
| Comparative Example 13 | 521 | 43 | 42 |
| Comparative Example 14 | 520 | 45 | 42 |

It can be seen from the above table that the present application can prepare a cyan-emitting InP nanocrystal successfully, and its fluorescence quantum yield is high, which proves that the InP nanocrystal obtained by the preparation method of the present application has excellent luminescence properties, thus expanding the application range of the InP nanocrystal.

Even though the inventor has made more specific explanation and enumeration to the technical solution of the present disclosure, it should be understood that any amendment and/or variation made to the above examples or the alternative technical solutions shall fall within the scope and spirit of the present application; moreover, terms in the present application are used for explaining and understanding the technical solution of the present application, but not used to limit the scope of the disclosure.

What is claimed is:

1. A preparation method of an indium phosphide nanocrystal, comprising a step of: using $M\text{-}(O\text{---}C\equiv P)_n$ as one of reaction precursors, wherein M is element Na, Li, K, Zn or Ga, and n is a valence state of the M element; subjecting a solution comprising an In precursor, $M\text{-}(O\text{---}C\equiv P)_n$, an optional Zn precursor and a solvent to high temperature treatment, thus obtaining an InP nanocrystal core.

2. The preparation method according to claim 1, wherein the reaction precursors further comprise an In precursor; and/or, the reaction precursors further comprise a Zn precursor.

3. The preparation method according to claim 1, wherein the InP nanocrystal comprises elements M, In and P, and an optional Zn element.

4. The preparation method according to claim 1, wherein, the high temperature treatment has a temperature within 150-340° C.

5. The preparation method according to claim 1, comprising a step of: coating a shell on the nanocrystal core; and/or, wherein the solvent is a coordination compound; the coordination compound is amine or carboxylic acid.

6. The preparation method according to claim 1, wherein the high temperature treatment has a temperature within 150-300° C.

7. A preparation method of a near-infrared InP nanocrystal, comprising the following steps:
S1, obtaining a first solution system comprising an In precursor and an optional Zn precursor, and a second solution system comprising $M\text{-}(O\text{---}C\equiv P)_n$, as a P precursor, wherein M is element Na, Li, K, Zn or Ga;
S2, mixing the first solution system with the second solution system for reaction at a predetermined temperature to obtain the near-infrared InP nanocrystal;
wherein the predetermined temperature has a range of 180-320° C., the first solution system comprises the In precursor, the optional Zn precursor and a first organic solvent dispersing the In precursor; and the second solution system comprises the P precursor and a second organic solvent dispersing the P precursor; the first organic solvent is different from the second organic solvent; and the second organic solvent has a boiling point lower than the predetermined temperature.

8. The preparation method according to claim 7, wherein the second organic solvent has a boiling point at least 30° C. lower than the predetermined temperature.

9. The preparation method according to claim 7, wherein the second organic solvent has a boiling point lower than or equal to 150° C.

10. The preparation method according to claim 7, wherein the In precursor is an indium halide; the first organic solvent is at least one of saturated or unsaturated amines having a carbon number not lower than 6, or carboxylic acids; and/or, the first solution system further comprises the Zn precursor; and/or, the shell of the nanocrystal comprises at least one of ZnS, ZnSe, and ZnSeS.

11. The preparation method according to claim 7, wherein the synthetic method further comprises a step S3, adding a precursor substance demanded for the synthesis of a shell of the nanocrystal to the reaction system of the S2 step, and forming a shell on a surface of the near-infrared InP nanocrystal, so that the near-infrared InP nanocrystal has a fluorescence emission peak within 700-900 nm.

12. The preparation method according to claim 7, wherein the second organic solvent has a boiling point of 60-150° C.; and/or, the second organic solvent comprises at least one of benzene, methylbenzene, cyclohexane, n-hexane, n-heptane, normal octane, tetrahydrofuran and chloroform.

13. A preparation method of an red-emitting InP nanocrystal, comprising steps of:
S1, mixing the In precursor and P precursor $M\text{-}(O\text{---}C\equiv P)_n$, with an organic solvent for reaction at a first temperature, and thermally insulating for a period of time to obtain an InP nanocrystal core solution, wherein M is element Na, Li, K, Zn or Ga; S2, rapidly heating the InP nanocrystal core solution up to a second temperature and thermally insulating for a period of time; S3, adding a precursor substance demanded for the synthesis of a shell of the nanocrystal to the reaction system of the S2 step to obtain the red-emitting InP nanocrystal, wherein the red-emitting InP nanocrystal has a fluorescence emission peak within 580-670 nm.

14. The preparation method according to claim 13, wherein the first temperature ranges from 110-160° C;and/or, the second temperature ranges from 280-340° C.

15. The preparation method according to claim 13, wherein in the S2, the InP nanocrystal core solution is rapidly heated up to the second temperature, keeping for at least 10 min.

16. The preparation method according to claim 13, wherein the organic solvent is selected from at least one of saturated or unsaturated amines having a carbon number not lower than 6, or carboxylic acids; and/or, the InP nanocrystal core solution optionally comprises a first Zn precursor, and the first Zn precursor is selected from a Zn halide; and/or, the shell of the nanocrystal comprises at least one of ZnS, ZnSe, and ZnSeS.

17. A preparation method of a cyan-emitting InP nanocrystal, comprising the following steps:
S1, mixing the In precursor and P precursor M-(O—C≡P)$_n$, with an organic solvent for reaction at a first temperature to obtain an InP nanocrystal core solution, wherein M is element Na, Li, K, Zn or Ga; S2, adding a cationic precursor to the InP nanocrystal core solution to form a first mixed solution at the first temperature; S3, adding a anionic precursor to the first mixed solution; wherein, the cationic precursor is reacted with the anionic precursor to coat a shell on the InP nanocrystal core, thus obtaining the cyan-emitting InP nanocrystal; the cyan-emitting InP nanocrystal has a fluorescence emission peak within 460-500 nm; and wherein, the second temperature is greater than the first temperature.

18. The preparation method according to claim 17, wherein the first temperature ranges from 110-160° C;and/or, the second temperature ranges from 160-240° C.

19. The preparation method according to claim 17, wherein the organic solvent is selected from at least one of saturated or unsaturated amines having a carbon number not lower than 6, or carboxylic acids; and/or, the InP nanocrystal core solution optionally comprises a first Zn precursor, and the first Zn precursor is selected from a Zn halide; and/or, a ratio of the Zn cationic precursor in the step S2 to the In precursor in the step S1 is (8-40):1 according to a molar ratio;

and/or, the cationic precursor is a second Zn precursor, and the second Zn precursor is selected from zinc carboxylate, or an organic zinc reagent; and/or, the anionic precursor is at least one of an S precursor and Se precursor.

* * * * *